(12) United States Patent
Thach et al.

(10) Patent No.: US 10,564,992 B2
(45) Date of Patent: Feb. 18, 2020

(54) SIMULATION APPARATUS AND STORAGE MEDIUM

(71) Applicant: FUJITSU LIMITED, Kawasaki-shi, Kanagawa (JP)

(72) Inventors: David Thach, Meguro (JP); Atsushi Ike, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 1629 days.

(21) Appl. No.: 14/246,483

(22) Filed: Apr. 7, 2014

(65) Prior Publication Data

US 2014/0316761 A1    Oct. 23, 2014

(30) Foreign Application Priority Data

Apr. 18, 2013 (JP) .................................. 2013-087874

(51) Int. Cl.
G06F 9/455 (2018.01)

(52) U.S. Cl.
CPC .......... *G06F 9/455* (2013.01); *G06F 2217/78* (2013.01)

(58) Field of Classification Search
None
See application file for complete search history.

(56) References Cited

U.S. PATENT DOCUMENTS

| 6,096,089 A | * | 8/2000 | Kageshima | G06F 17/5022 |
| | | | | 703/18 |
| 2002/0032559 A1 | * | 3/2002 | Hellestrand | G06F 11/261 |
| | | | | 703/22 |
| 2008/0177527 A1 | * | 7/2008 | Yoshinaga | G06F 9/455 |
| | | | | 703/26 |

FOREIGN PATENT DOCUMENTS

| JP | 07-021061 | 1/1995 |
| JP | 2000-242529 | 9/2000 |

* cited by examiner

*Primary Examiner* — Bijan Mapar
(74) *Attorney, Agent, or Firm* — Staas & Halsey LLP

(57) ABSTRACT

A simulation apparatus includes a memory, and a second processor configured to detect an internal state of the first processor in the operation simulation, when a target block in the operation simulation changes, the target block being included in blocks obtained by dividing code of the program, generate association information in which the internal state detected by the detecting section and performance values of instructions included in the target block in the detected internal state are associated with each other, and execute an execution code that allows a performance value when the first processor executes the target block to be calculated based on the association information, by using the internal state detected and the association information generated for the target block, to thereby calculate a performance value when the first processor executes the target block.

8 Claims, 25 Drawing Sheets

FIG. 4

```
ld      [r1], (r2;)      //[r1]→r2
mult    r3,  r4, (r5;)   //r3*r4→r5
add     (r2,)(r5,) r6;   //r2+r5→r6
```

FIG. 5

| INSTRUCTION | SOURCE REGISTER | DESTINATION REGISTER | PENALTY |
|---|---|---|---|
| ld | rs1: e1 | rd: e2 | CASH MISS: 6 |
| mult | rs1: e1, rs2: e2 | rd: e3 | – |
| add | rs1: e1, rs2: e1 | rd: e2 | – |

FIG. 8

```
cache_ld( address, rep_delay, pre_delay ) {
            avail_delay = 0;
            if(pre_delay < current_time − preld_time)
                        avail_delay = pre_delay − current_time + preld_time;
            cache_lookup( address );
            if(cache_hit) {
                        cache_update_onhit( address );
            } else {
                        cache_update_onmiss( address );
                        avail_delay += cache_miss_latency
                        if(rep_delay < avail_delay)
                                    avail_delay −= avail_delay − rep_delay;
            }
            preld_time = current_time;
}
```

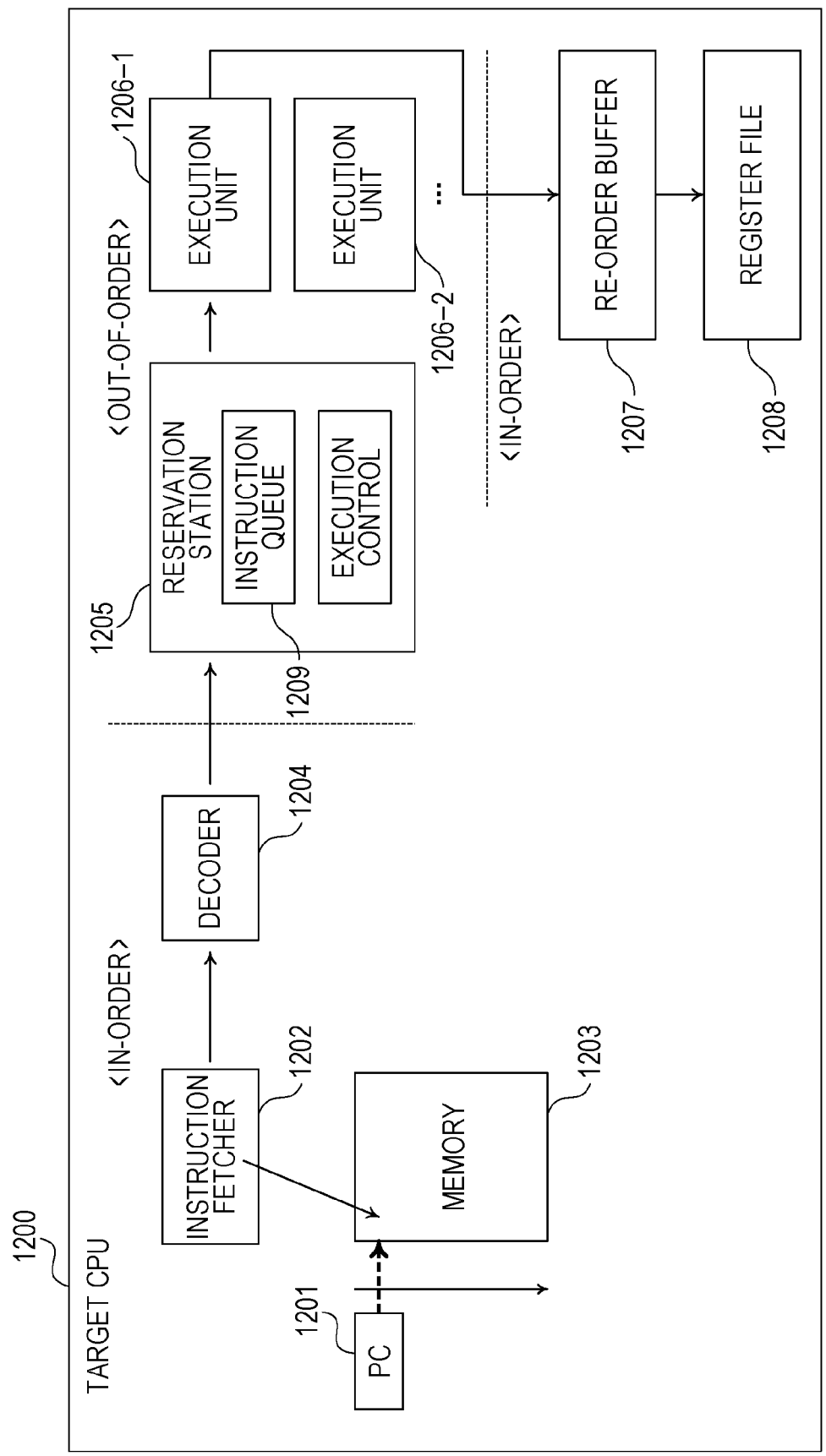

FIG. 17 ec

```
1: imul %ecx, %eax    ; %eax <- %eax * %ecx     ⎫
2: inc %ecx           ; %ecx <- %ecx + 1        ⎬ c1
3: cmp $10, %ecx                                ⎭
4: mov (state), %ebx  ; (PERFORMANCE CALCULATION INSTRUCTION) %ebx <- state  ⎫
5: mov (cycle), %edx  ; (PERFORMANCE CALCULATION INSTRUCTION) %edx <- cycle  ⎪
6: add %ebx(perf1), %edx ; (PERFORMANCE CALCULATION INSTRUCTION) %edx <-     ⎬ c2
   %edx+[perf1+%ebx]                                                         ⎪
7: mov %edx, (cycle)  ; (PERFORMANCE CALCULATION INSTRUCTION) cycle <- %edx  ⎭
8: jle 1              ; if %ecx <= 10 then 1    } c1
```

| PROCESSOR INTERNAL STATE | INSTRUCTION | PERFORMANCE VALUE [CLOCK] |   |
|---|---|---|---|
| INTERNAL STATE A | 1 | 2 | ⎫ |
|  |  |  | ⎬ 101-A |
|  |  |  | ⎭ |
| INTERNAL STATE B | 1 | 4 | ⎫ |
|  |  |  | ⎬ 101-B |
|  |  |  | ⎭ |

FIG. 25

| PROCESSOR INTERNAL STATE | INSTRUCTION | PERFORMANCE VALUE [CLOCK] | POINTER TO NEXT BLOCK | POINTER TO NEXT ASSOCIATION INFORMATION |
|---|---|---|---|---|
| INTERNAL STATE A | 1 | 2 | 0x80005000 | 0x80006000 |
| INTERNAL STATE B | 1 | 4 | 0x80001000 | 0x80001500 |

2500

2300-A: INTERNAL STATE A row
2300-B: INTERNAL STATE B row

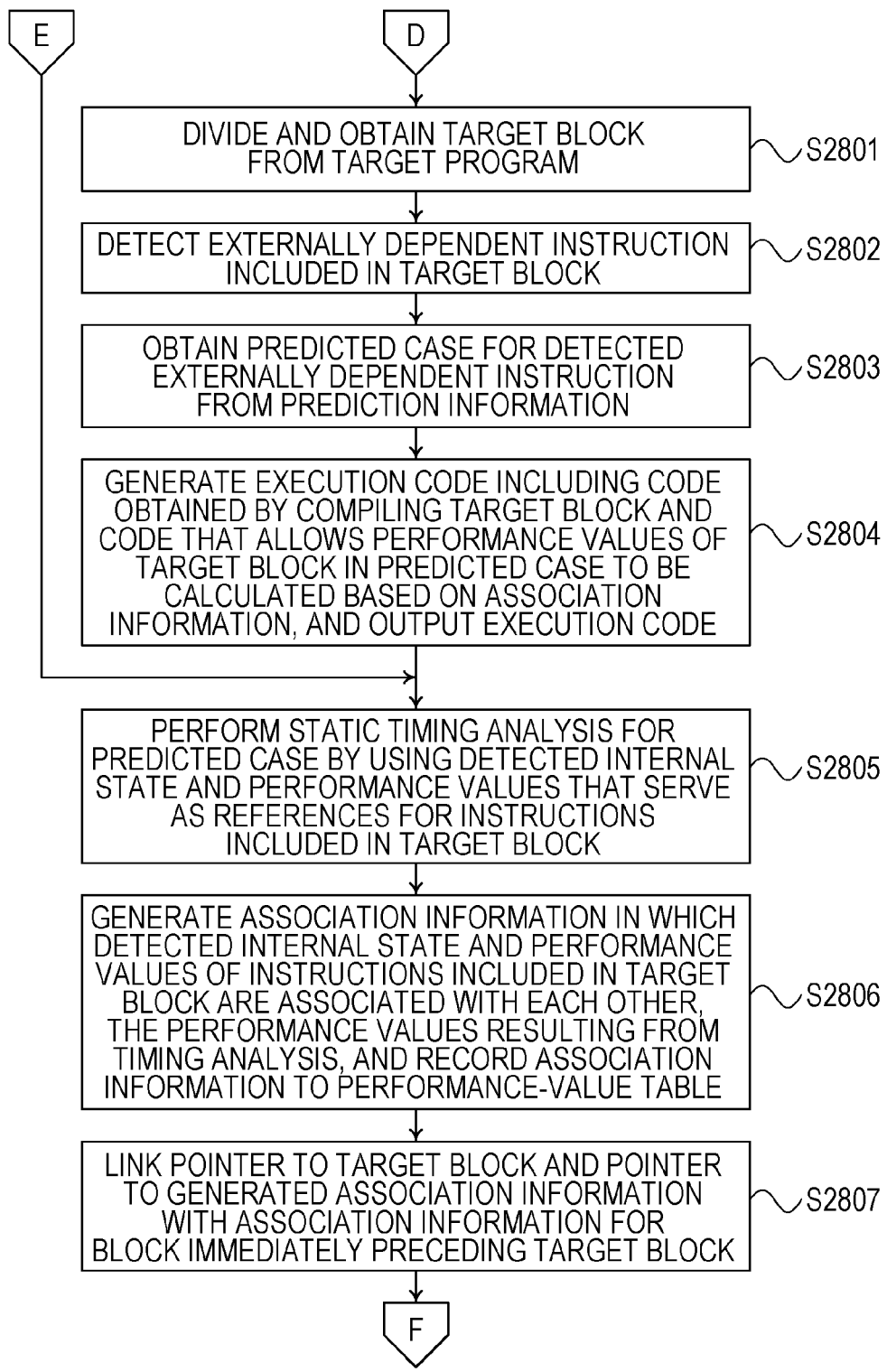

SIMULATION APPARATUS AND STORAGE MEDIUM

CROSS-REFERENCE TO RELATED APPLICATION

This application is based upon and claims the benefit of priority of the prior Japanese Patent Application No. 2013-087874 filed on Apr. 18, 2013, the entire contents of which are incorporated herein by reference.

FIELD

The embodiments discussed herein are related to a simulation apparatus, a simulation method, and a storage medium storing a simulation program.

BACKGROUND

Heretofore, technologies for estimating performance, such as the execution time of a program, when a program is operated on a processor are available in order to aid development of the program (for example, see Japanese Laid-open Patent Publication No. 2000-242529). There is also a technology for determining the number of static execution cycles considering a pipeline interlock for each block by dividing the code of a program into multiple blocks (for example, see Japanese Laid-open Patent Publication No. 7-21061).

SUMMARY

According to an aspect of the embodiment, a simulation apparatus that executes an operation simulation when an first out-of-order execution processor executes a program includes a memory, and a second processor coupled to the memory and configured to detect an internal state of the first processor in the operation simulation, when a target block in the operation simulation changes, the target block being included in blocks obtained by dividing code of the program, generate association information in which the internal state detected by the detecting section and performance values of instructions included in the target block in the detected internal state are associated with each other, and execute an execution code that allows a performance value when the first processor executes the target block to be calculated based on the association information in which the internal state and the performance values are associated with each other, by using the internal state detected and the association information generated for the target block, to thereby calculate a performance value when the first processor executes the target block.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of instructions included in a block;

FIG. 5 is a table illustrating an example of timing information;

FIG. 8 illustrates a processing operation of a correcting section in the simulation apparatus;

FIG. 12 is a block diagram illustrating an example of a target CPU;

FIG. 17 is a table illustrating an example of an execution code;

FIG. 18 is a table illustrating an example of a performance-value table according to the first embodiment;

FIG. 25 is a block diagram illustrating an example of a performance-value table according to the second embodiment;

FIG. 28 is a flowchart (part 3) illustrating the example of the procedure of the simulation processing performed by the simulation apparatus according to the second embodiment.

DESCRIPTION OF EMBODIMENTS

A simulation apparatus, a simulation method, and a simulation program according to the present disclosure will be described below in detail with reference to the accompanying drawings. In the present embodiment, a second processor included in a simulation apparatus executes simulation for a function and performance of a first processor when the first processor to be evaluated executes a target program. For example, an interpreter system or a just-in-time (JIT) compiler system are available as a scheme for converting a target program of the first processor into code executable by the second processor while the second processor performs simulation. A simulation apparatus according to the present embodiment performs simulation of the performance by using a JIT compiler system.

Figure 1:
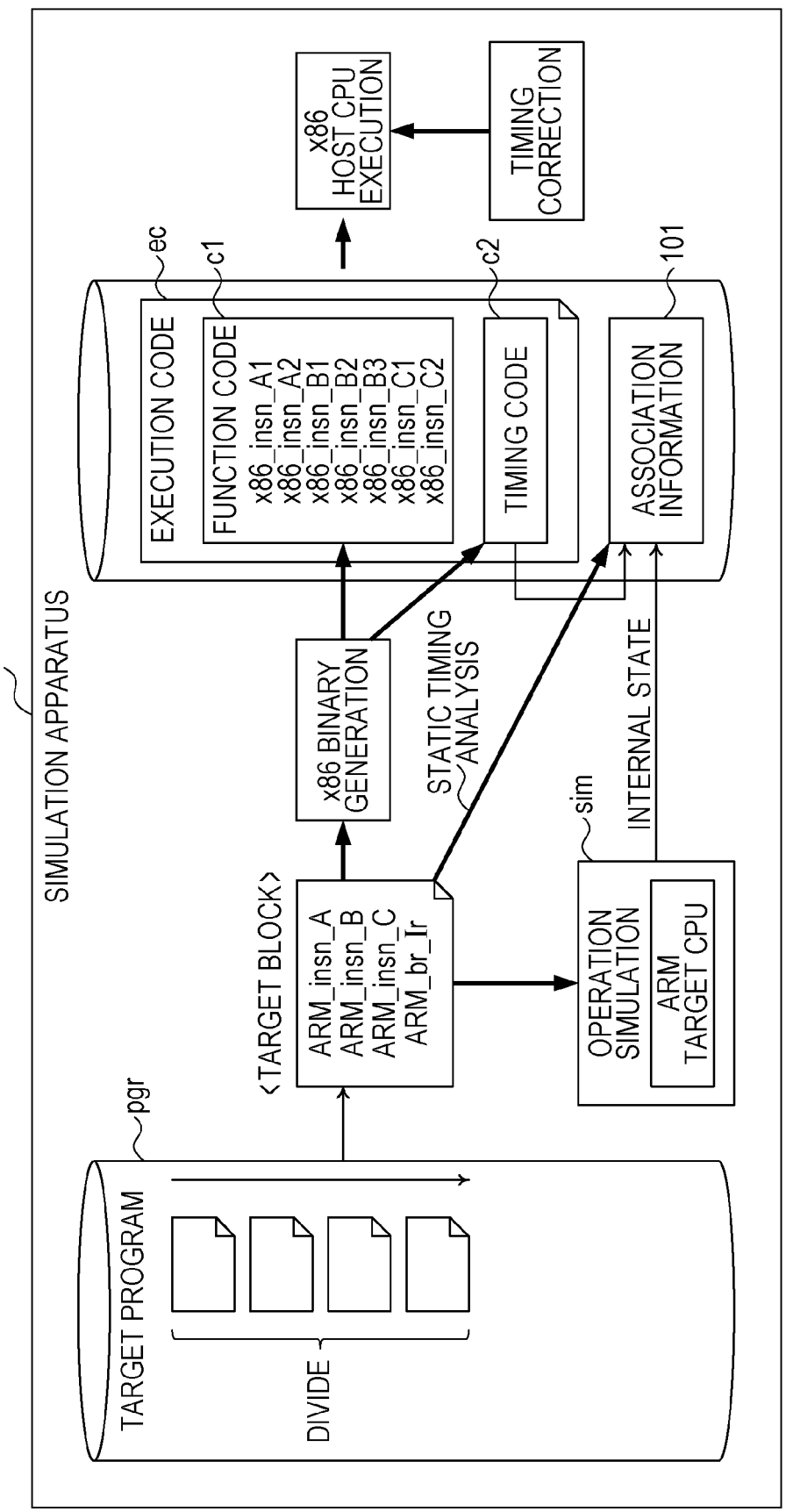
FIG. 1 is a block diagram illustrating an example of operation performed by a simulation apparatus according to the present disclosure.

FIG. 1 is a block diagram illustrating an example of operation performed by the simulation apparatus according to the present disclosure. A simulation apparatus 100 may be a computer that executes an operation simulation sim when an out-of-order execution processor executes a target program pgr. The out-of-order execution processor may herein be referred to as a "target central processing unit (CPU)". A processor included in the simulation apparatus 100 is referred to as a "host CPU". In an example in FIG. 1, the target CPU is an ARM (registered trademark) architecture CPU and the host CPU in the simulation apparatus 100 is, for example, an x86 architecture CPU. The operation simulation sim in this case is a simulation performed, for example, by giving the target program pgr to a model of a system having the target CPU and hardware resources accessible by the target CPU. The model of the system in this case is, for example, a behavior model that reproduces only system functions by using a hardware description language.

The simulation apparatus 100 detects an internal state of the target CPU in the operation simulation sim when a target block of the operation simulation sim changes, the target block being included in blocks obtained by dividing the code of the target program pgr. The internal state of the target CPU refers to, for example, setting values of registers or the like included in the target CPU. The simulation apparatus 100 is capable of determining an execution status of the target program pgr by using the setting values of the registers or the like included in the target CPU in the operation simulation sim. The unit of block division may be, for example, a basic (fundamental) block unit or any predefined code. The "basic block" as used herein refers to a code that has one ingress and one egress and that does not include any branch code therein. All of the blocks may be divided in advance, or only a target block may be divided when one block becomes a target block.

When the target block changes, the simulation apparatus 100 generates an execution code ec for the target block. The "execution code ec" as used herein refers to a code that allows the host CPU to calculate, when the target CPU executes the target block, performance values by using association information 101 in which performance values and the internal state of the target CPU are associated with each other. FIG. 18 illustrates a specific example of the association information 101. Examples of the performance values include a processing time and the number of cycles.

For example, the execution code ec includes a function code c1 and a timing code c2. The function code c1 is a code that is obtained by compiling a target block and is executable by the host CPU. The timing code c2 is a code for estimating performance values of the function code c1. For example, when the performance value is the number of cycles, the timing code c2 is, for example, a code that adds the number of cycles "cycle" by obtaining a performance value through use of the internal state as a parameter, in the following manner.

Cycle=Cycle+Performance Value [Internal State]

In such a manner, the execution code ec generated in the present embodiment is a code that can obtain performance values, not a code that states specific performance values. Thus, it is sufficient to generate the execution code ec for the same block only once. Accordingly, the simulation apparatus 100 determines whether or not the target block in question has become a target block in the past. For example, when the target block in question has not become a target block in the past, an execution code ec for the target block has not been generated, and thus the execution code ec for the target block is newly generated. On the other hand, for example, when the target block in question has become a target block in the past, an execution code ec for the target block has already been generated, and thus the execution code ec for the target block is not generated. Upon determining that the target block in question has not become a target block in the past, the simulation apparatus 100 generates an execution code ec for the target block. On the other hand, upon determining the target block in question has become a target block in the past, the simulation apparatus 100 does not generate an execution code ec. Thus, since an execution code ec is not generated a number of times for the same block, it is possible to reduce the amount of memory during estimation of performance values.

The simulation apparatus 100 generates association information 101 in which the detected internal state and performance values of instructions included in the target block in the detected internal state are associated with each other. Each time the internal state varies, association information 101 for the target block is generated. For example, the simulation apparatus 100 determines the performance values of instructions included in the target block by using the detected internal state and performance values serving as references for the instructions included in the target block. The performance values serving as references for the instructions included in the target block may be pre-stored in a storage device accessible by the simulation apparatus 100, may be input by a user of the simulation apparatus 100, or may be obtained from another apparatus by the simulation apparatus 100. Specifically, for example, when the performance value is the number of cycles or an execution time, the simulation apparatus 100 performs static timing analysis by using the detected internal state and the performance value that serves as a reference for each instruction included in the target block.

More specifically, for example, based on the detected internal state, the simulation apparatus 100 determines execution statuses, such as the order of execution of instructions in the immediately preceding target block in the operation simulation sim and a completion status of each instruction. The simulation apparatus 100 obtains the performance value of each instruction included in the target block in the detected internal state, for example, by adding or subtracting the performance value that serves as a reference of each instruction included in the target block, in accordance with the execution statuses.

A description will be briefly given of a method for statically estimating the performance values of instructions included in a target block in a detected internal state when the performance value is the number of cycles. For example, in a case in which a second instruction included in a target block uses an execution result of a first instruction included in a block immediately preceding the target block, when the execution of the first instruction is not finished, the simulation apparatus 100 adds a performance value corresponding to the amount of delay of the first instruction to a performance value that serves as a reference of the second instruction. For example, even though the target block changes, there is a case in which the target block includes a second instruction that is to use an execution unit being used by a first instruction whose execution has not been completed, the first instruction being included in instructions included in the immediately preceding block. In such a case, the simulation apparatus 100 adds a performance value corresponding to the amount of delay of the first instruction to the performance value that serves as a reference of the second instruction. In such a manner, the simulation apparatus 100 statically estimates the performance values of the instructions in the target block, based on the detected internal state.

Next, the simulation apparatus 100 executes the execution code ec by using the association information 101 generated for the target block and the detected internal state, to thereby calculate a performance value when the target CPU executes the target block.

According to FIG. 1, even when the order of instructions to be executed changes, it is possible to accurately estimate the performance values of a block when the out-of-order execution target CPU performs execution, since performance values have already been determined based on the internal state.

In FIG. 1, a detailed description of processing for correcting a performance value during execution of the execution code ec is not given.

(Example of Hardware Configuration of Simulation Apparatus 100)

Figure 2:
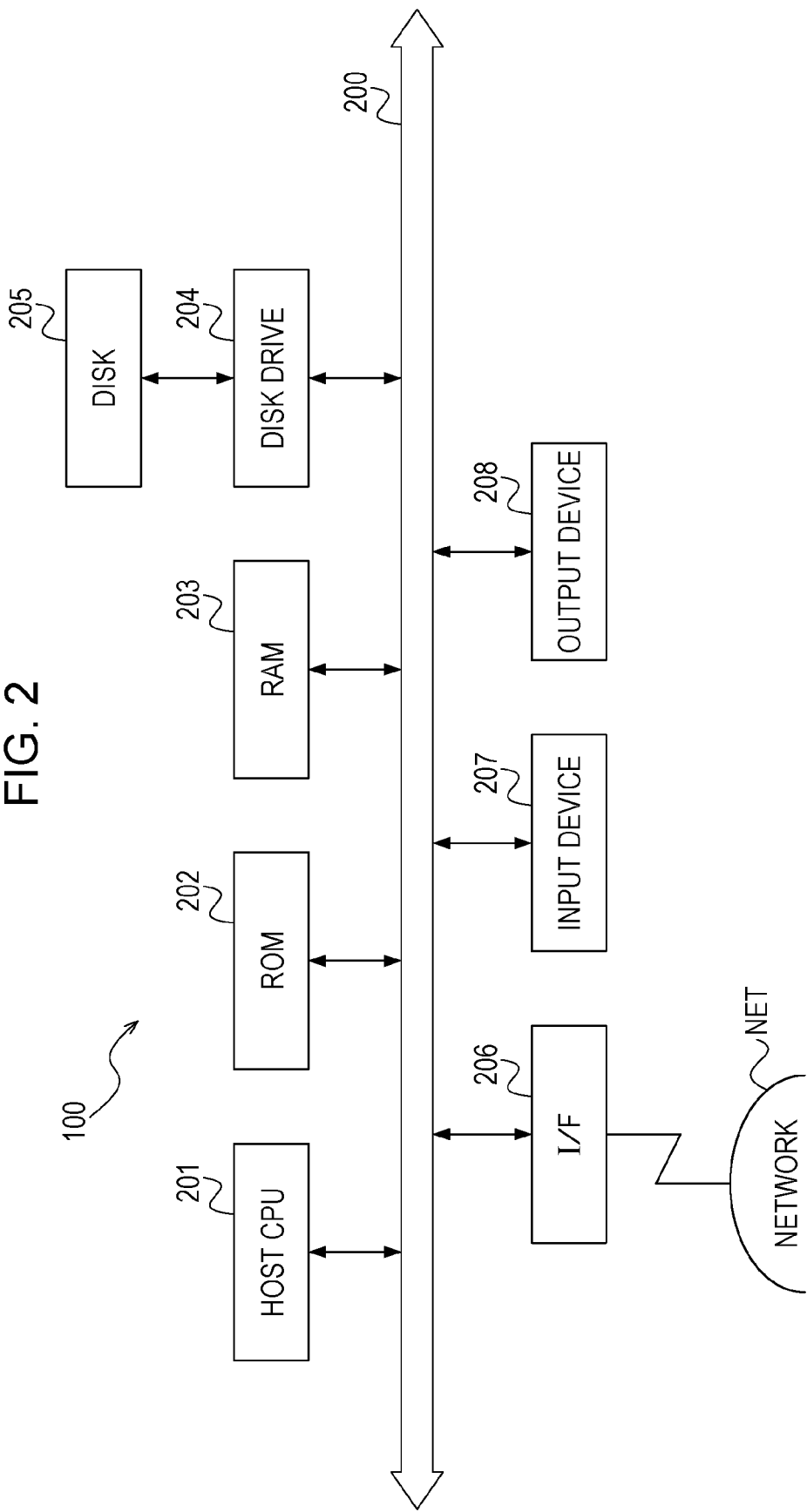
FIG. 2 is a block diagram illustrating an example of a hardware configuration of the simulation apparatus according to an embodiment.

FIG. 2 is a block diagram illustrating an example of a hardware configuration of the simulation apparatus according to an embodiment. The simulation apparatus 100 includes a host CPU 201, a read only memory (ROM) 202, a random access memory (RAM) 203, a disk drive 204, and a disk 205. The simulation apparatus 100 further includes an interface (I/F) 206, an input device 207, and an output device 208. Those elements are interconnected through a bus 200.

The host CPU 201 is responsible for overall control of the simulation apparatus 100. The ROM 202 stores therein a program such as a boot program. The RAM 203 is a storage section used as a work area for the host CPU 201. In accordance with control performed by the host CPU 201, the disk drive 204 controls writing/reading data to/from the disk 205. Data written according to the control performed by the disk drive 204 is stored on the disk 205. Examples of the disk 205 include a magnetic disk and an optical disk.

The I/F 206 is connected to a network NET through a communication line and is connected to another apparatus through the network NET. Examples of the network NET include a local area network (LAN), a wide area network (WAN), and the Internet. The I/F 206 serves as an interface between the network NET and the internal elements to control outputting/inputting data to/from an external apparatus. The I/F 206 may be implemented by, for example, a modem or a LAN adapter.

The input device 207 serves as an interface that a user operates to input various types of data. Examples of the input device 207 include a keyboard, a mouse, and a touch panel. The input device 207 may also load a still image or a moving image from a camera. The input device 207 may also receive audio from a microphone. The output device 208 serves as an interface for outputting data in response to an instruction from the host CPU 201. Examples of the output device 208 include a display and a printer.

Before the simulation apparatus 100 when the target CPU is an out-of-order execution CPU is described in detail, a description will be given of the simulation apparatus when the target CPU is an in-order execution CPU.

(Simulation Apparatus when Target CPU is in-Order Execution CPU)

Figure 3:
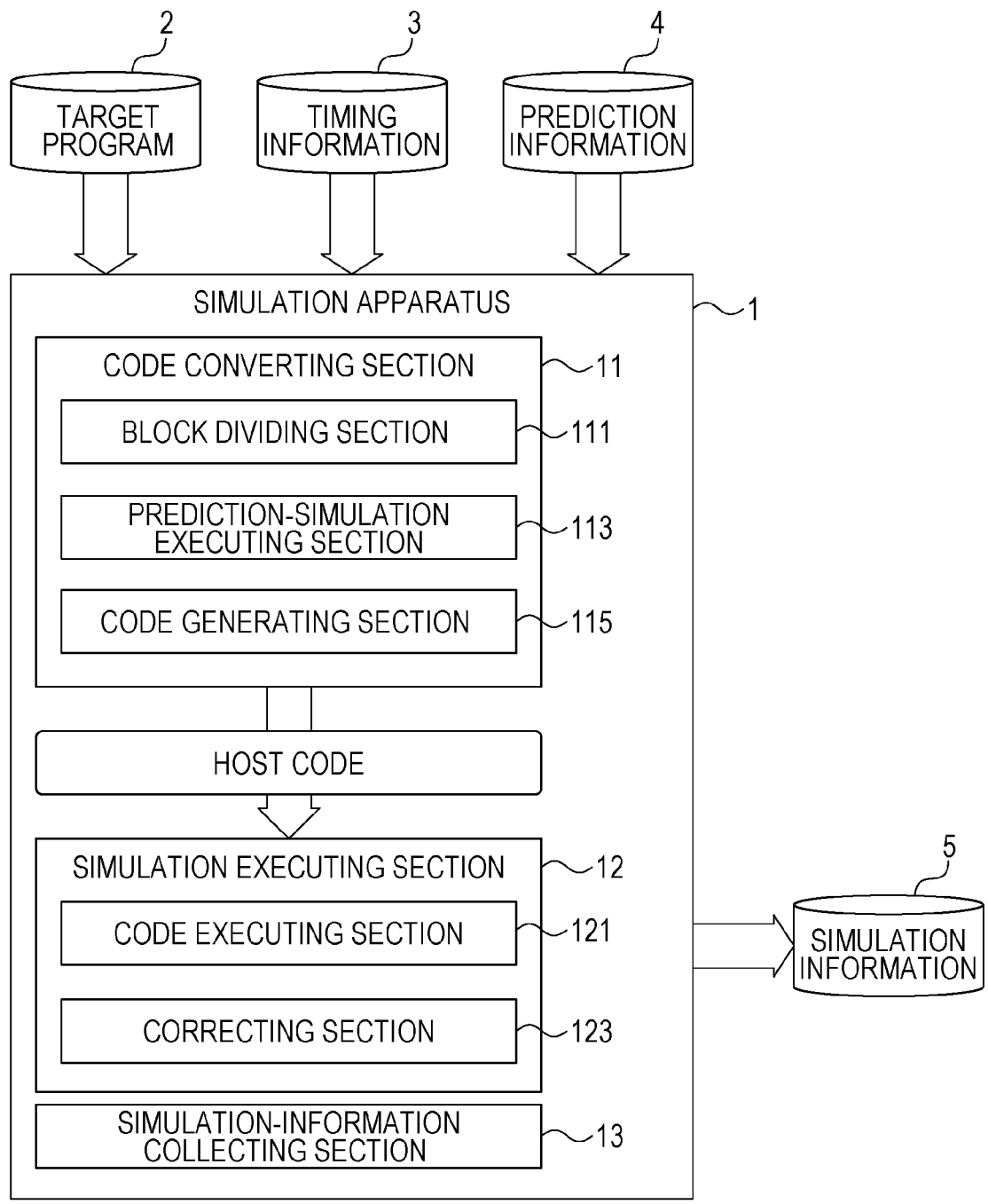
FIG. 3 is a diagram illustrating an example of the configuration of the simulation apparatus according to the embodiment.

First, an overview of the configuration of the simulation apparatus and an overview of a simulation operation when the target CPU is an in-order execution CPU will be described with reference to FIGS. 3 to 11D. FIG. 3 is a diagram illustrating an example of the configuration of the simulation apparatus according to the embodiment. A simulation apparatus 1 is an apparatus that executes performance simulation of instruction execution of the target CPU for controlling pipeline processing. The hardware configuration of the simulation apparatus 1 is assumed to be the same as or similar to the hardware configuration of the simulation apparatus illustrated in FIG. 2.

The target CPU is a control model of a CPU to be simulated. The simulation apparatus 1 outputs cycle-simulation information of each instruction in the performance simulation of instruction execution of the target CPU. The target CPU in this case is, for example, an ARM architecture CPU. The simulation apparatus 1 corresponding to the host CPU is, for example, a computer having an x86 architecture CPU.

The simulation apparatus 1 includes a code converting section 11, a simulation executing section 12, and a simulation-information collecting section 13. The code converting section 11 is a processing section for generating, when the target CPU executes a program, a code (host code) of the host CPU for executing simulation, based on a code (target code) of the program executed by the target CPU. A target program 2, timing information 3 regarding the target program 2, and prediction information 4 are input to the simulation apparatus 1.

The code converting section 11 includes a block dividing section 111, a prediction-simulation executing section 113, and a code generating section 115. The block dividing section 111 divides the target code of the program input to the simulation apparatus 1 into predetermined blocks. The unit of the block division may be, for example, a unit of a general basic block or any predetermined unit of code. The prediction-simulation executing section 113 is a processing selection that obtains the timing information 3 and the prediction information 4 and performs a performance simulation in which an input block is executed under a condition predicated on a certain execution result. The code generating section 115 is a processing section that generates, based on a result of the simulation performed by the prediction-simulation executing section 113, host code for performing a performance simulation during execution of an instruction in a pre-set predicted case, as host code for a processed block.

The simulation executing section 12 is a processing section that executes the host code generated by the code generating section 115 to perform function and performance simulation of instruction execution of the target CPU that executes the program (target code). The simulation executing section 12 has a code executing section 121 and a correcting section 123. The code executing section 121 is a processing section for executing the program (target code) by using the host code. The correcting section 123 is a processing section for determining, when an execution result of an externally dependent instruction is different from a pre-set prediction result (this case corresponds to as an unexpected case), the execution time of the instruction by correcting an already determined execution time in an expected case, during execution of the program. The correcting section 123 performs the correction by using a penalty time given to the externally dependent instruction, the execution times of instructions executed before and after the execution of the externally dependent instruction, a delay time of an immediately preceding instruction, and so on. Details of the correction processing are described later.

The simulation-information collecting section 13 is a processing section for collecting log information (simulation information) 5 including the execution time of each instruction as an execution result of the performance simulation.

FIG. 4 is a diagram illustrating an example of instructions included in a block. As illustrated in FIG. 4, it is assumed that one block includes three instructions in the target code: (1) an instruction "ld r1, r2" (load); (2) an instruction "mult r3, r4, r5 (multiplication)"; and (3) an instruction "add r2, r5, r6 (addition)", which are input to a pipeline of the target CPU and executed in the order (1) to (3). In this case, r1 to r6 in the instructions represent registers (addresses).

The timing information 3 includes, for each of the instructions in the target code, information indicating an association between each processing element (stage) at the time of instruction execution and available registers and also includes, for each externally dependent instruction of the instructions, information indicating a penalty time (the number of penalty cycles) that defines a delay time corresponding to a result of the execution. Each externally dependent instruction is an instruction for performing processing to which an external environment is related. Examples of the externally dependent instruction include a load instruction and a store instruction. The externally dependent instruction performs processing in which a result of the execution of the instruction depends on an external environment other than the target CPU. Examples of such processing include instruction cache, data cache, and translation lookaside buffer (TLB) search, as well as processing, such as branch prediction, call/return stack.

FIG. 5 is a table illustrating an example of the timing information. The timing information 3 illustrated in FIG. 5 indicates that, with respect to the ld instruction, the source register rs1 (r1) is suable for a first processing element (e1) and the destination register rd (r2) is usable for a second processing element (e2). The timing information 3 also indicates that, with respect to the mult instruction, the first source register rs1 (r3) is suable for the first processing element (e1), the second source register rs2 (r4) is suable for the second processing element (e2), and the destination register rd (r5) is suable for a third processing element (e3). The timing information 3 also indicates, with respect to the add instruction, the first source register rs1 (r2) and the second source register rs2 (r5) are usable for the first processing element (e1) and the destination register rd (r6) is usable for the second processing element (e2).

Figure 6A:
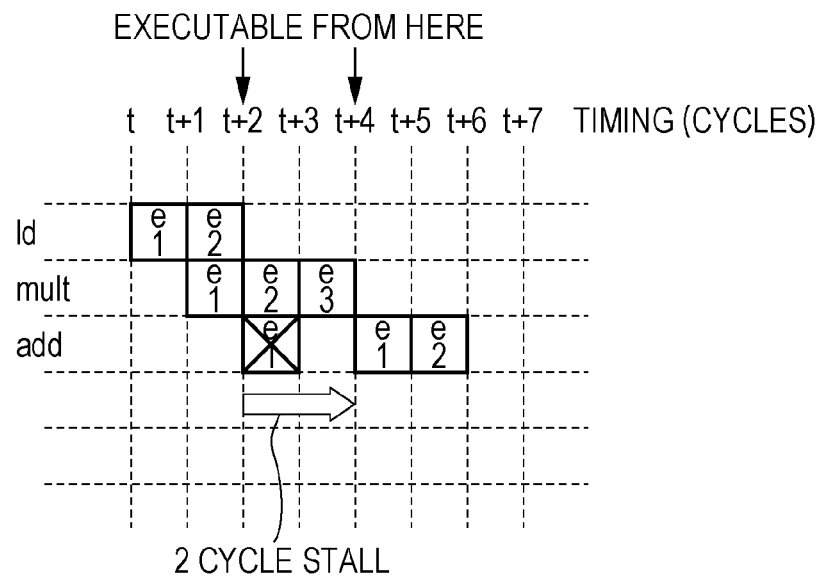
FIGS. 6A and 6B are diagrams illustrating an example of execution timings of instructions in the block illustrated in FIG. 4.
Figure 6B:
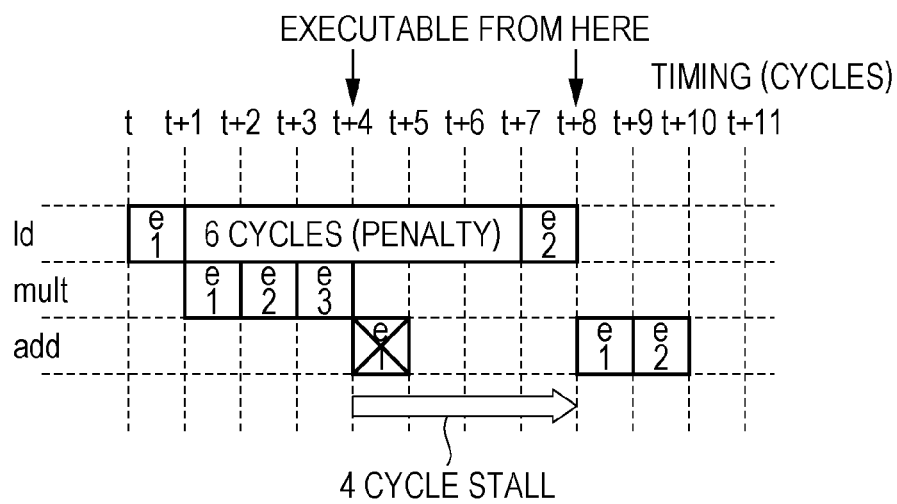

FIGS. 6A and 6B are diagrams illustrating an example of execution timings of instructions in the block illustrated in FIG. 4. Based on the timing information 3 illustrated in FIG. 5, the mult instruction is input to the pipeline at timing t+1, and the add instruction is input to the pipeline at timing t+2, when the ld instruction is assumed to be executed at timing t. Since the first source register (r2) and the second source register (r5) for the add instruction are used by the ld instruction and the mult instruction, the add instruction is started after timing t+4 at which the execution of the ld instruction and the mult instruction is completed. That is, latency corresponding to 2 cycles (stall corresponding to 2 cycles) occurs.

Thus, it can be seen from FIG. 6A that, when the block illustrated in FIG. 4 is simulated, the execution time of the block is 6 cycles in a case in which an execution result of the ld instruction is cache hit. FIG. 6B illustrates an example of timing when the execution result of the ld instruction in the block illustrated in FIG. 4 is cache miss. An arbitrary amount of time (corresponding to 6 cycles in this case) that is presumed to be sufficient for re-execution is set in the timing information 3 as a penalty. Thus, when the execution result of the ld instruction is cache miss, the penalty cycles, that is, 6 cycles, is added as a delay time. Thus, execution of the second processing element (e2) is delayed to timing t+7. The mult instruction next to the ld instruction is executed without being affected by the delay, but the add instruction is executed after the timing t+8 at which the execution of the ld instruction is completed, thus causing latency corresponding to 4 cycles (stall corresponding to 4 cycles).

Thus, it can be understood that, as illustrated in FIG. 6B, when the execution of the instructions in the block illustrated in FIG. 4 is simulated, the execution time is 10 cycles in a case in which the execution result of the ld instruction is cache miss. The prediction information 4 specifies an execution result (a prediction result) that is highly probable in processing of an externally dependent instruction in the target code. The prediction information 4 specifies, for example, the following information:

instruction cache: prediction=hit,
data cache: prediction=hit,
TLB search: prediction=hit,
branch prediction: prediction=hit, and
call/return: prediction=hit, . . . .

Based on the prediction information 4, the prediction-simulation executing section 113 sets a prediction result of an externally dependent instruction included in an input block. By referring to the timing information 3, the prediction-simulation executing section 113 executes an instruction when a preset prediction result is predicated (that is, a predicted case), to simulate the progress of the instruction execution. The prediction-simulation executing section 113 determines the execution time (the number of cycles involved) of each instruction included in the block as a simulation result.

Based on the target code for the block, the code generating section 115 generates host code for performing instruction execution when the result of the externally dependent instruction matches the predicted case, which is a prediction result, and further incorporates a simulation code for performing processing for calculating the processing time of the block by adding the execution times of instructions. For example, with respect to processing in which "cache hit" is set as a prediction result for the ld instruction in data, the code generating section 115 simulates processing execution when cache access due to the ld instruction in the block is "hit", to determine the execution time in this predicted case.

With respect to the execution time when cache access due to the Id instruction is "cache miss", the code generating section 115 generates host code for performing processing for determining the execution time by performing correction calculation using addition/subtraction of an execution time in the case of "cache hit", which is a predicted case.

The flow of the processing of the simulation apparatus 1 in the embodiment will be described below.

[Code Conversion Processing]

(1) The block dividing section 111 in the code converting section 11 in the simulation apparatus 1 holds the target code of the target program 2 in a storage section (not illustrated) and divides the held target code into arbitrary blocks (see FIG. 4).

(2) The prediction-simulation executing section 113 obtains the timing information 3 and the prediction information 4 with respect to the input target program 2 and stores the obtained timing information 3 and prediction information 4 in the storage section. Based on the prediction information 4, the prediction-simulation executing section 113 sets a prediction result for each of externally dependent instructions in the divided block. For example, the prediction-simulation executing section 113 sets "hit" as a prediction result of data cache for the Id instruction of the instructions illustrated in the block illustrated in FIG. 4.

(3) The prediction-simulation executing section 113 interprets the code in the block and simulates instruction execution in a case predicated on a pre-set prediction result. That is, the prediction-simulation executing section 113 simulates instruction execution in the timing example illustrated in FIG. 6A.

(4) Next, the code generating section 115 generates host code from the target code, based on a simulation result in the predicted case. In addition, the code generating section 115 incorporates a cycle simulation code for executing performance simulation (cycle simulation) into the host code (only function code) converted from the target code.

Figure 7A:
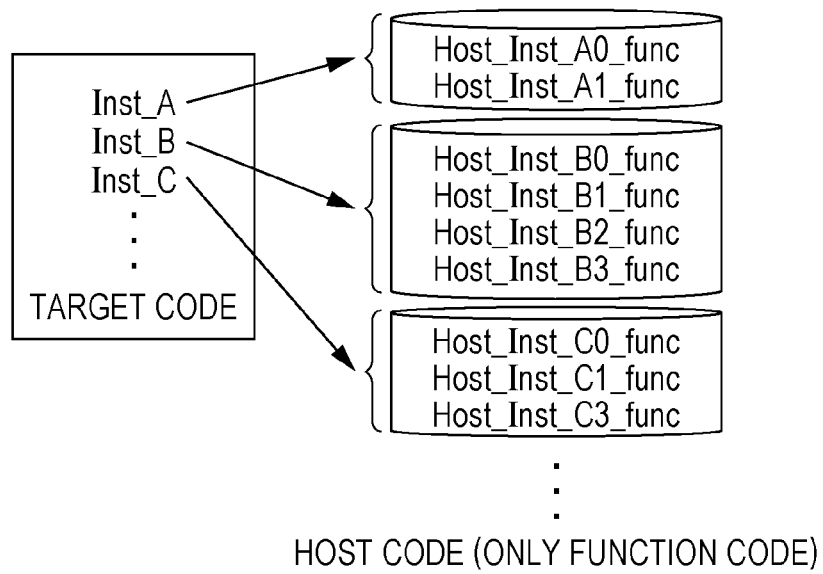
FIGS. 7A and 7B illustrate an example in which a cycle simulation code is incorporated.
Figure 7B:
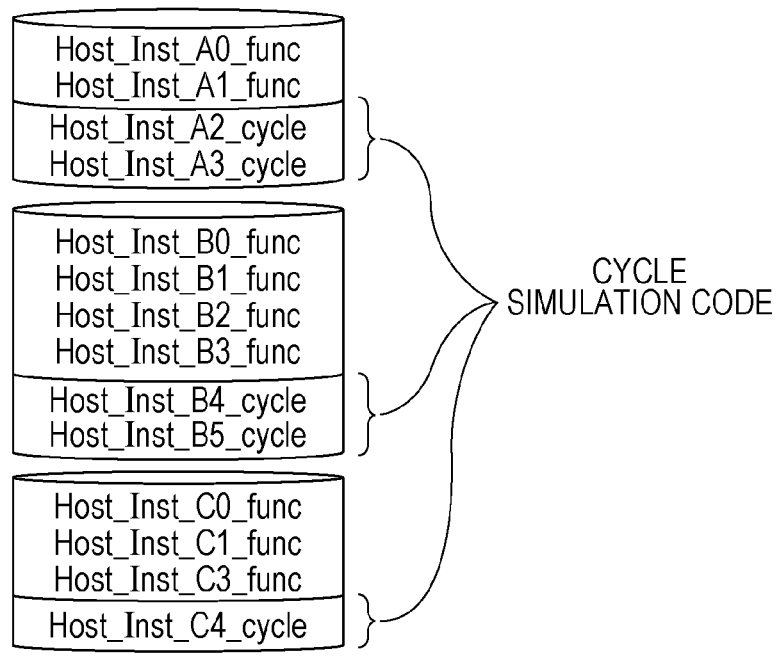

FIGS. 7A and 7B illustrate an example in which a cycle simulation code is incorporated. FIG. 7A illustrates an example in which host code including only function code is generated based on target code, and FIG. 7B illustrates an example in which a cycle simulation code is incorporated into the host code including the function code. As illustrated in FIG. 7A, a target code Inst_A is converted into host codes Host_Inst_A0_func and Host_Inst_A1_func, and a target code Inst_B is converted into host codes Host_Inst_B0_func, Host_Inst_B1_func, and Host_Inst_B2_func, . . . to generate host code including only the function codes.

In addition, codes Host_Inst_A2_cycle and Host_Inst_A3_cycle for cycle simulation of the target code Inst_A are incorporated into the host code including only the function codes, and codes Host_Inst_B4_cycle and Host_Inst_B5_cycle for cycle simulation of the target code Inst_B are incorporated into the host code including only the function codes.

The cycle-simulation code is code for determining the processing time for the block by expressing the execution time (the number of cycles involved) of each instruction as a constant and summing the execution times of the instructions. The cycle-simulation code can obtain information indicating the progress of the execution of the block. In this case, of the host code, the function code and the cycle-simulation code for instructions other than externally dependent instructions may be implemented using known code, and thus a specific example of such code is not described herein. The cycle-simulation code for externally dependent instructions is prepared as a helper-function call instruction. The helper function is a function for performing correction processing for correcting the execution time based on whether or not the predicted case matches the execution result of the operation simulation sim as described above with reference to FIG. 1. A detailed example of the helper function is described later.

[Simulation Processing]

(1) The code executing section 121 in the simulation executing section 12 performs performance simulation of the target program 2 by using the host code generated by the code converting section 11. The code executing section 121 simulates the instruction execution of the target program 2 to obtain the execution time of each instruction.

(2) Upon detecting an externally dependent instruction (for example, the Id instruction) during the simulation execution, the code executing section 121 determines whether or not the execution result is different from the pre-set prediction result. When the execution result is different from the prediction result, the code executing section 121 requests startup of the correcting section 123. For example, when the instruction "Id r1, r2" is detected and the prediction result (cache hit) of the data cache and the actual execution result (cache miss) are different from each other, the correcting section 123 is called.

(3) The correcting section 123 is started up in response to the call and corrects the execution time (the number of cycles) of the detected instruction "Id r1, r2". By performing the correction, the correcting section 123 also varies the execution timing t+n of the next instruction. Each time the execution result of an externally dependent instruction differs from the prediction result, the correcting section 123 corrects the execution time of the instruction. In this case, since the execution time of the externally dependent instruction in the predicted case has already been expressed by a constant, the correcting section 123 can calculate the execution time of the externally dependent instruction in the unexpected case by simply adding or subtracting the values of the time of the penalty time for the instruction, the execution times of instructions executed before and after that instruction, the delay time of the previously processed instruction, and so on.

FIG. 8 illustrates a processing operation of the correcting section 123 in the simulation apparatus 1. The correcting section 123 is executed as a helper function module. In the present embodiment, for example, the correcting section 123 is implemented by incorporating a helper function "cache_Id (address rep_delay pre_delay)", instead of a typical function "cache_Id (address)" for performing simulation for each cache-execution result of a Id instruction, into the host code.

The helper function "rep_delay" indicates the time (respite time) that is not processed as a delay time in the penalty time until the execution of a next instruction that uses a return value of this load (Id) instruction. "Pre_delay" indicates a delay time received from the immediately preceding instruction. Also, "−1" indicates that the previous instruction has no delay. "Rep_delay" and "pre_delay" are time information obtained from the result of the static analysis processing of the performance-simulation result and the timing information 3.

In the operation illustrated in FIG. 8, when the difference between current timing current_time and execution timing preId_time of the immediately preceding Id instruction exceeds the delay time pre_delay of the immediately preceding Id instruction, the correcting section 123 determines an available delay time avail_delay by adjusting the delay time pre_delay by using the from the execution timing preld_time of the immediately preceding Id instruction to the current timing current_time.

Next, when the execution result indicates cache miss, this is an error of the prediction result, and the correcting section 123 adds a penalty time cache_miss_latency during the cache miss to the available delay time avail_delay and corrects the execution time of the Id instruction based on the respite time rep_delay.

FIGS. 9A to 11D illustrate an example of correction on an execution result of the Id instruction, the correction being executed by the correcting section 123. FIGS. 9A to 9D are diagrams illustrating an example of correction on an execution result of the Id instruction, the correction being performed by the correcting section 123 in the simulation apparatus 1. An example of correction when one cache miss occurs in a case in which one cache process is executed will be described with reference to FIGS. 9A to 9D.

In the example in FIGS. 9A to 9D, simulation of the following three instructions are executed:

Id [r1], r2: [r1]→r2;
mult r3, r4, r5: r3*r4→r5; and
add r2, r5, r6: r2+r5→r6.

Figure 9A:
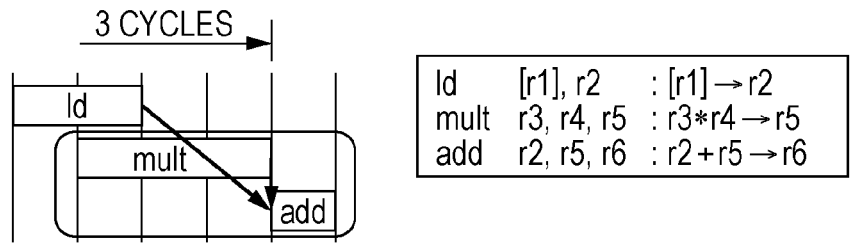
FIGS. 9A to 9D are diagrams illustrating an example of correction on an execution result of a ld instruction, the correction being performed by the correcting section in the simulation apparatus.
Figure 9B:
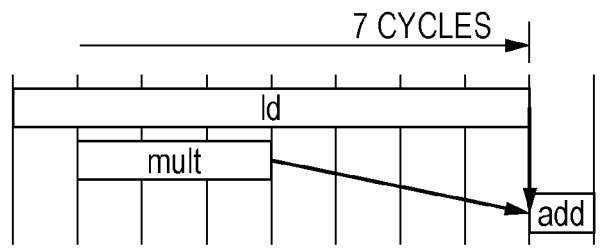
Figure 9C:
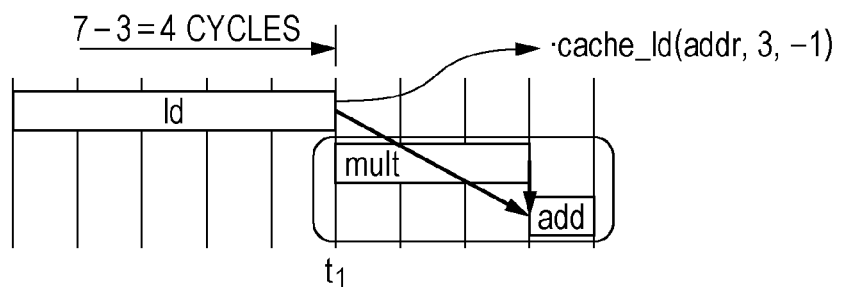

FIG. 9A is a diagram illustrating an example of a chart of instruction execution timings when a prediction result is "cache hit". In this predicted case, two-cycle stall occurs in an add instruction executed as a third instruction. FIG. 9B is an example of a chart of instruction execution timings when the prediction result is "cache miss". In the case of this prediction miss, when the execution result of the Id instruction is cache miss, a delay corresponding to penalty cycles (6 cycles) occurs. Accordingly, the mult instruction is executed without being affected by the delay, but the execution of the add instruction is delayed by an amount corresponding to 4 cycles in order to wait for the completion of the Id instruction. FIG. 9C is a diagram illustrating an example of a timing chart of instruction execution after the correcting section 123 performs the correction.

Since the execution result of the Id instruction is cache miss (an erroneous prediction result), the correcting section 123 adds a penalty time (6 cycles) for a predetermined cache miss to the remaining execution time (2−1=1 cycle) to determine an available delay time (7 cycles). The available delay time reaches the maximum delay time. In addition, the correcting section 123 obtains the execution time (3 cycles) of the next mult instruction, determines that the execution time of the next instruction does not exceed the delay time, and sets the time (7−3=4 cycles), obtained by subtracting the execution time of the next instruction from the available delay time, as the execution time (delay time) involving the delay of the Id instruction. The correcting section 123 sets, as the respite time, the time (3 cycles) obtained by subtracting that delay time from the available delay time. The respite time is the time for which a delay due to a penalty is respited. The correcting section 123 returns a respite time rep_delay=3 and the delay time pre_delay=−1 (no delay) of the previous instruction by using a helper function cache_Id (addr, rep_delay, pre_delay).

As a result of the correction, the execution time of the Id instruction becomes the execution time (1+4=5 cycles) obtained by adding the time in which the Id instruction was executed and the delay time, so that the execution times of the subsequent mult instruction and add instruction are calculated based on the timing $t_1$ of the execution completion. That is, the execution time (the number of cycles) of the block can be obtained by simply adding the execution time (3 cycles) of the mult instruction and the execution time (3 cycles) of the add instruction, the execution times being pre-determined based on the processing result of the prediction-simulation executing section 113 (the result of the prediction simulation based on the prediction result) to the execution time (5 cycles) of the corrected Id instruction.

Thus, the number of execution cycles in the simulation during cache miss can also be determined with high accuracy by performing correction processing involving addition or subtraction of only the execution time of an instruction whose execution result is different from its prediction and merely adding, with respect to another instruction, an execution time determined during simulation based on a prediction result.

Figure 9D:
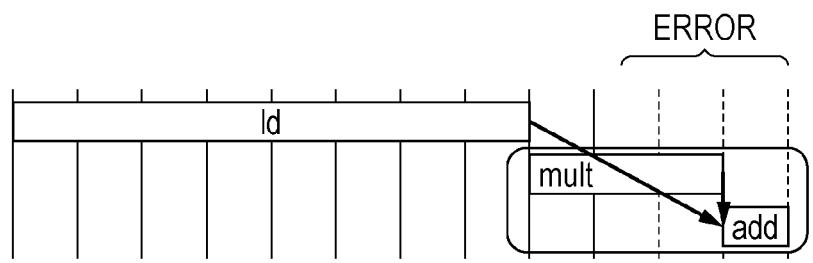

FIG. 9D is a diagram illustrating the amount of error when the number of cycles during cache miss is determined by simple addition according to related art, for comparison with the processing performed by the simulation apparatus 1. In the case illustrated in FIG. 9D, since the delay time of the Id instruction is directly added, it can be understood that, in practice, an error due to the execution timing of the mult instruction whose execution is completed during execution of the Id instruction occurs.

FIGS. 10A to 10D are diagrams illustrating an example of correction on an execution result of the Id instruction, the correction being performed by the correcting section 123 in the simulation apparatus 1. FIGS. 10A to 10D illustrate an example of correction when two cache misses occur in a case in which two cache processes are executed. In the example in FIGS. 10A to 10D, the following five instructions are simulated:

Id [r1], r2: [r1]→r2;
Id [r3], r4: [r3]→r4;
mult r5, r6, r7: r5*r6→r7;
add r2, r4, r2: r2+r4→r2; and
add r2, r7, r2: r2+r7→r2.

Figure 10A:
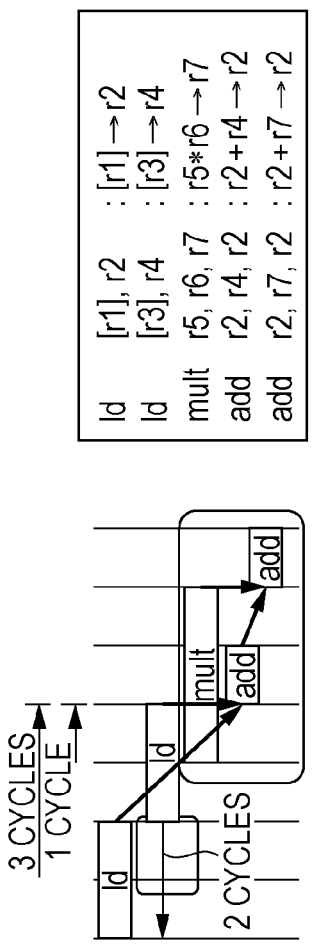
FIGS. 10A to 10D are diagrams illustrating an example of correction on an execution result of a ld instruction, the correction being performed by the correcting section in the simulation apparatus.
Figure 10B:
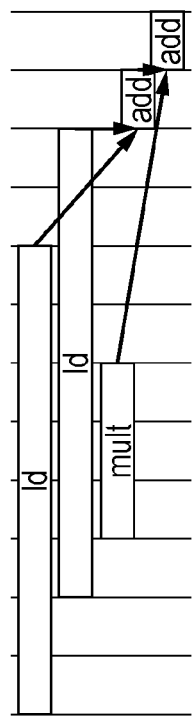
Figure 10C:
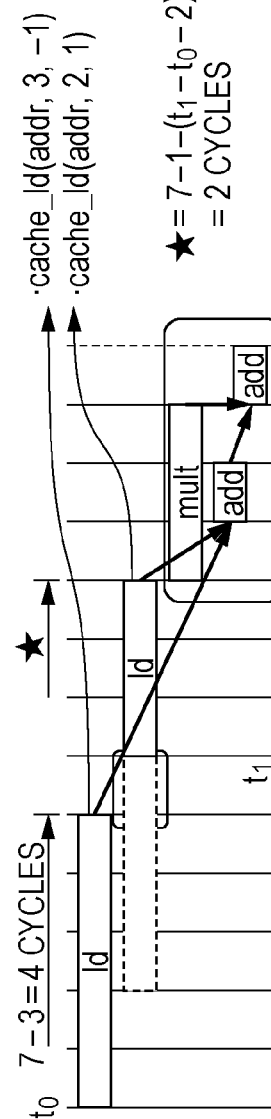

FIG. 10A is an example of a chart of instruction execution timings when the prediction result in the two cache processes indicate "cache hit". In this predicted case, it is assumed that two Id instructions are executed at an interval of 2 cycles (typical 1 cycle+added 1 cycle). FIG. 10B is a diagram illustrating an example of a chart of instruction execution timings in the case of "cache miss" in which the execution results of both of the two cache processes are different from their prediction results. In the case of the prediction errors, there are cache misses in both of the two Id instructions, so that a delay corresponding to the penalty cycle (6 cycles) occurs. However, the delay times of the two Id instructions have an overlapping time, so that the mult instruction is executed without being affected by the delay, and the execution of the two add instructions is delayed until the completion of the second Id instruction. FIG. 10C is a diagram illustrating an example of a timing chart of instruction execution after the correcting section 123 performs correction.

As described above with reference to FIGS. 9A to 9D, the correcting section 123 corrects the delay time of the first Id instruction at timing $t_0$ and returns a helper function cache_Id (addr, 3, −1). Next, at current timing $t_1$, since an execution result of the second Id instruction is cache miss (an error in the prediction result), the correcting section 123 adds penalty cycles (6) to the remaining execution time of the Id instruction to determine an available delay time (1+6=7 cycles).

The correcting section 123 subtracts the delay time spent up to the current timing $t_1$ (that is, (Current timing $t_1$−Execution timing $t_0$ of Previous instruction)−Set interval) from the available delay time to determine an available delay time (7−(6−2)=3 cycles) that has exceeded from the current timing $t_1$. The correcting section 123 sets the excess available delay time as the execution time of the second Id instruction. In addition, the correcting section 123 determines the delay time of the previous instruction by subtracting the original execution time from the excess available delay time (3−1=2 cycles). The correcting section 123 also determines a respite time (7−(3+3)=1 cycle) by subtracting the total of the delay time spent until the current timing $t_1$ and the available delay time that exceeded at the current timing $t_1$ from the available delay time.

After correcting the delay time of the second Id instruction at timing $t_1$, the correcting section 123 returns a helper function cache_Id (addr, 2, 1). As a result of the correction, the timing obtained by adding the corrected value (3 cycles) to the current timing $t_1$ becomes the execution completion timing of the Id instruction, and from the execution completion timing, the execution times of a subsequent mult instruction and an add instruction are added.

Figure 10D:
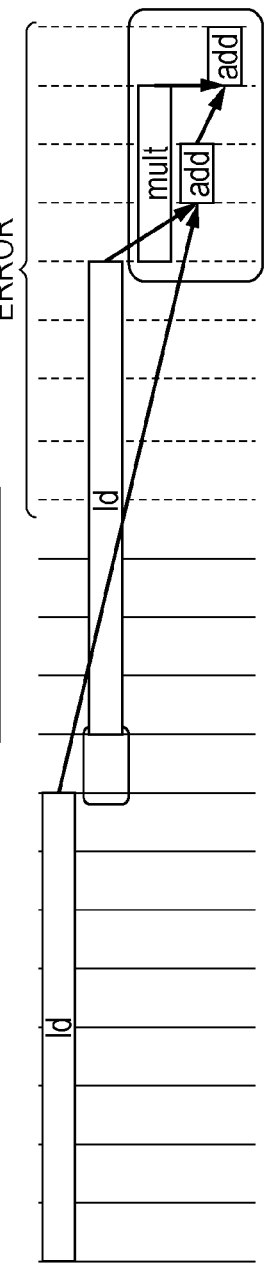

FIG. 10D is a diagram illustrating the amount of error when the number of cycles during cache miss is determined by simple addition according to the related art, for comparison with the processing performed by the simulation apparatus 1. In the case illustrated in FIG. 10D, it can be understood, since the delay time based on the penalty given to the two Id instructions is directly added, a large amount of error (8 cycles) occurs. Although the processing (illustrated in FIG. 10C) performed by the correcting section 123 also has an error (1 cycle), compared with the correct simulation as illustrated in FIG. 10B, it can be understood that the number of cycles can be determined with significantly higher accuracy than the case in the related scheme.

FIGS. 11A to 11D are diagrams illustrating an example of correction on an execution result of the Id instruction, the correction being performed by the correcting section 123. A description will be given of an example of correction when one cache miss occurs in a case in which two cache processes are executed. In the example illustrated in FIGS. 11A to 11D, simulation of fives instructions that are similar to those in the example described above and illustrated in FIGS. 10A to 11D is executed.

Figure 11A:
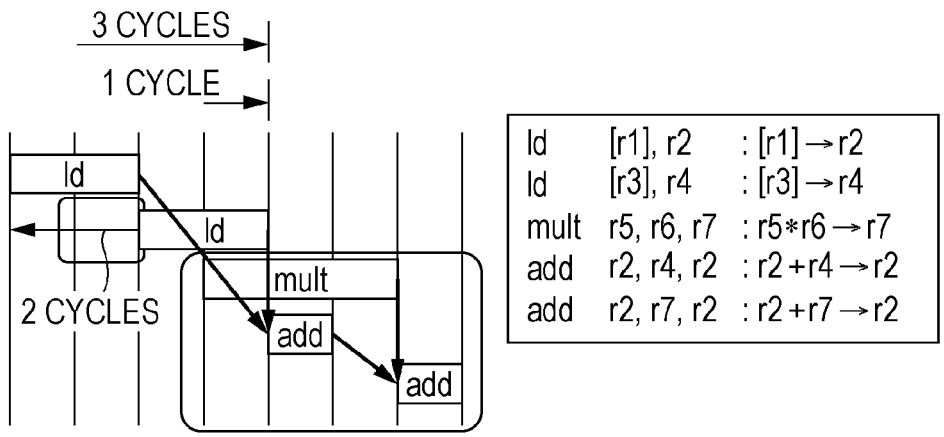
FIGS. 11A to 11D are diagrams illustrating an example of correction on an execution result of a ld instruction, the correction being performed by the correcting section.
Figure 11B:
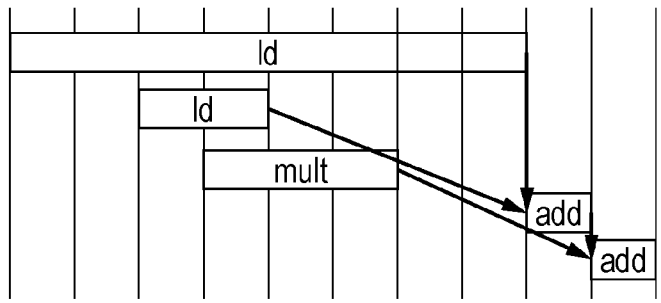
Figure 11C:
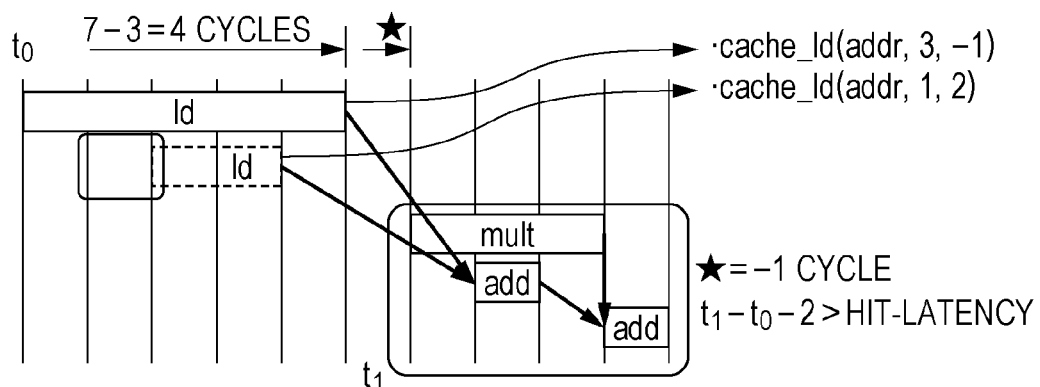

FIG. 11A is a diagram illustrating an example of a chart of instruction execution timings when the prediction results of two cache processes are "cache hit". In this predicted case, it is assumed that two Id instructions are executed at an interval of 2 cycles (typical 1 cycle+added 1 cycle), as in the case in FIG. 10A. FIG. 11B is a diagram illustrating an example of a chart of instruction execution timings when the first Id instruction is "cache miss", which is different from the prediction result, and the result of the second Id instruction matches the prediction result (cache hit). In the case of this prediction error, a delay corresponding to penalty cycles (6 cycles) occurs in the first Id instruction. The second Id instruction and the mult instruction are executed without being affected by the delay. The execution of two add instructions is delayed until the completion of the first Id instruction. FIG. 11C is a diagram illustrating an example of a timing chart of instruction execution after the correcting section 123 performs correction.

A timing $t_0$, the correcting section 123 corrects the delay time of the first Id instruction and returns a helper function cache_Id (addr, 3, −1), as described above with reference to FIG. 9C. Next, at current timing $t_1$, since the execution result of the second Id instruction is cache hit (the prediction result), the correcting section 123 determines whether or not the time from the start of execution of the Id instruction to the current timing $t_1$ (that is, $t_1-t_0$−Set interval (6−0−2=4 cycles)) is larger than the execution time (2 cycles) of the Id instruction. Since the time from the start of the execution of the second Id instruction to the current timing $t_1$ is larger than the execution time (2 cycles) of the Id instruction the correcting section 123 sets the current timing $t_1$ as the execution timing of the next mult instruction.

Thereafter, the correcting section 123 regards the time (2 cycles) from the completion of the execution of the second Id instruction to the current timing $t_1$ as a delay time for the next instruction to determine a delay time pre_delay=2 of the previous instruction. The correcting section 123 also subtracts the total of the delay time spent until the current timing $t_1$ and the available delay time that has exceeded at the current timing $t_1$ from the available delay time of the first Id instruction (7−(6+0)=1 cycle) to determine a respite time rep_delay=1 and returns a helper function cache_Id (addr, 1, 2).

Figure 11D:
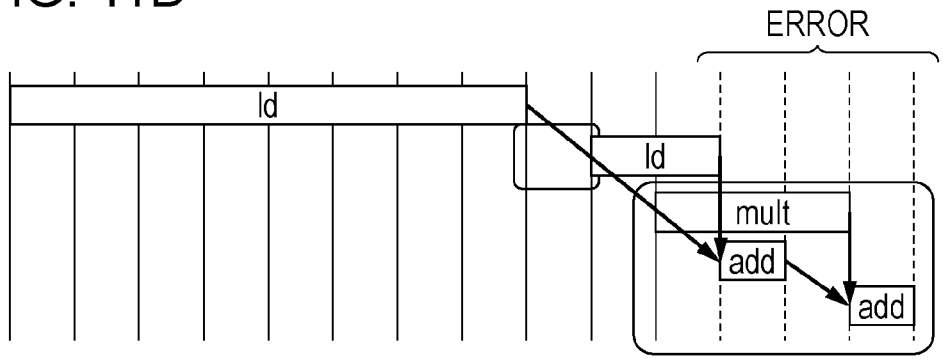

FIG. 11D is a diagram illustrating the amount of error when the number of cycles during cache miss is determined by simple addition according to the related art, for comparison with the processing performed by the simulation apparatus 1. In the case in FIG. 11D, it can be understood that an error occurs since the delay time due to the penalty of the first Id instruction is directly added.

The above-described simulation apparatus 1 may have a configuration in which a power-simulation-information generating section is further added to the example of the configuration illustrated in FIG. 3. The power-simulation-information generating section is a processing section that calculates the power consumption during execution of a block based on simulation information output by the simulation-information collecting section 13 in response to power information and outputs power simulation information. A description will now be given of an example in which the power-simulation-information generating section is implemented as a function (a power simulation function) that is incorporated into the host code for performance simulation. In this case, the power consumption per execution of the Id instruction, the mult instruction, and the add instruction are set as, for example, 4u[W], 0.5u[W], and 0.3u[W] as the power information. A power simulation function Host_Inst_A-C_power calculates power, based on the number of executions of each instruction executed in the simulation.

(Simulation Apparatus 100 when Target CPU According to Present Embodiment is Out-of-Order Execution CPU)

In the present embodiment, a description will be given of the simulation apparatus 100 when the target CPU is an out-of-order execution CPU. First, a description will be briefly given of an out-of-order execution target CPU.

FIG. 12 is a block diagram illustrating an example of the target CPU. Now, a description will be briefly given of an out-of-order target CPU 1200. The target CPU 1200 includes a program counter (PC) 1201, an instruction fetcher 1202, a decoder 1204, and a reservation station 1205 having an instruction queue 1209. The target CPU 1200 includes a plurality of execution units 1206, a re-order buffer 1207, and a register file 1208. The PC 1201 is one type of register and stores therein the address of a memory 1203 at which an instruction to be executed next is stored. The instruction queue 1209 temporarily stores therein instructions deciphered by the instruction fetcher 1202. For example, the reservation station 1205 controls inputting, to the execution unit 1206, an instruction that has become executable among instructions stored in the instruction queue 1209. The execution unit 1206 is a unit that is capable of executing, for example, a computational operation corresponding to each instruction. The re-order buffer 1207 temporarily stores therein instructions deciphered by the instruction fetcher 1202. With respect to each of the stored instructions, the re-order buffer 1207 has information indicating either an execution-waiting state or an execution-completed state. The register file 1208 has a plurality of registers and performs management, such as selecting one of the registers and writing an execution result thereto.

Processes performed by the target CPU 1200 will now be described in sequence.

(1) The target CPU 1200 uses the instruction fetcher 1202 to fetch an instruction from the memory 1203 and uses the decoder 1204 to decode an instruction.

(2) The target CPU 1200 inputs the decoded instruction into the instruction queue 1209 and records the instruction to the re-order buffer 1207.

(3) The target CPU 1200 controls the reservation station 1205 to input, to the execution unit 1206, an instruction that has become executable among instructions in the instruction queue 1209 in the reservation station 1205.

(4) After the execution section 1206 completes the processing for the instruction, the target CPU 1200 stores the execution result in the re-order buffer 1207.

(5) The target CPU 1200 changes the state of the instruction on which the processing by the execution unit 1206 has been completed to "completed", the instruction being included in the instructions in the re-order buffer 1207.

(6) When the execution of the oldest instruction is completed among the instructions in the re-order buffer 1207, the target CPU 1200 writes back the execution result of the instruction to the register file 1208.

(7) The target CPU 1200 deletes the instruction in the "completed" state from the re-order buffer 1207.

In the present embodiment, for example, the instruction queue 1209, the usage state of the execution unit 1206, the contents stored in the re-order buffer 1207, and the address of an instruction executed immediately before the target block are used as the internal state of the target CPU 1200.

A description will be given of an example in which the order of execution in a program in the out-of-order execution target CPU 1200 changes. For example, it is assumed that the execution order indicated by a program is as follows. In the following example of instructions, the number in ( ) indicates an execution order, and the portion following ";" is annotation.

(1) Instruction 1: Idr r0, [r1]; r0<-[r1],
(2) Instruction 2: add r0, r0, 1; r0<-r0+1,
(3) Instruction 3: mov r2, 0; r2<-0

It takes time for the instruction 1 to be executed and the instruction 2 depends on the execution result of the instruction 1. Thus, the execution order indicated by the program and the execution order executed by the out-of-order execution target CPU 1200 are different from each other. In the following example of instructions, the number in ( ) indicates an execution order, and the portion following ";" is annotation.

(1) Instruction 1: Idr r0, [r1]; r0<-[r1],
(2) Instruction 3: mov r2, 0; r2<-0,
(3) Instruction 2: add r0, r0, 1; r0<-r0+1

Since a change in the order of instructions occurs in the out-of-order execution target CPU 1200, there is a possibility that a delay of execution of one instruction affects another block. It is assumed that the blocks included in the program are executed in an order as described below. B1 to B3 represent blocks.

B1: Instruction 1 (an instruction that takes time for execution)
B2: Instruction 2 (an instruction that is dependent on the instruction 1)
B2: Instruction 3 (an instruction that is dependent on the instruction 1)
B3: Instruction 4 (an instruction that is not dependent on the instruction 1)

Since the instruction 4 is not dependent on the instruction 1 and does not take time for execution, the execution of the instruction 4 is completed earlier than the instruction 2 and the instruction 3, as described below.

B1: Instruction 1 (an instruction that takes time for execution)
B3: Instruction 4 (an instruction that is not dependent on the instruction 1)
B2: Instruction 2 (an instruction that is dependent on the instruction 1)
B2: Instruction 3 (an instruction that is dependent on the instruction 1)

Thus, the simulation apparatus 100 according to the present embodiment pre-detects the internal state of the target CPU 1200 when the target block changes and statically pre-determines performance values of instructions included in the target block in the detected internal state. As a result, it is possible to enhance the accuracy of estimating the performance values when the out-of-order execution target CPU 1200 executes the target block.

(First Embodiment)

In a first embodiment, for each detected internal state of the target CPU 1200, association information 101 in which the internal state and the performance values of instructions included in the target block in the internal state are associated with each other is generated, and one execution code ec that allows performance values of the block to be calculated based on the association information 101 is generated. With this arrangement, since the execution code ec is not generated a number of times, it is possible to reduce the amount of memory for estimating the performance values of a block.

Figure 13:
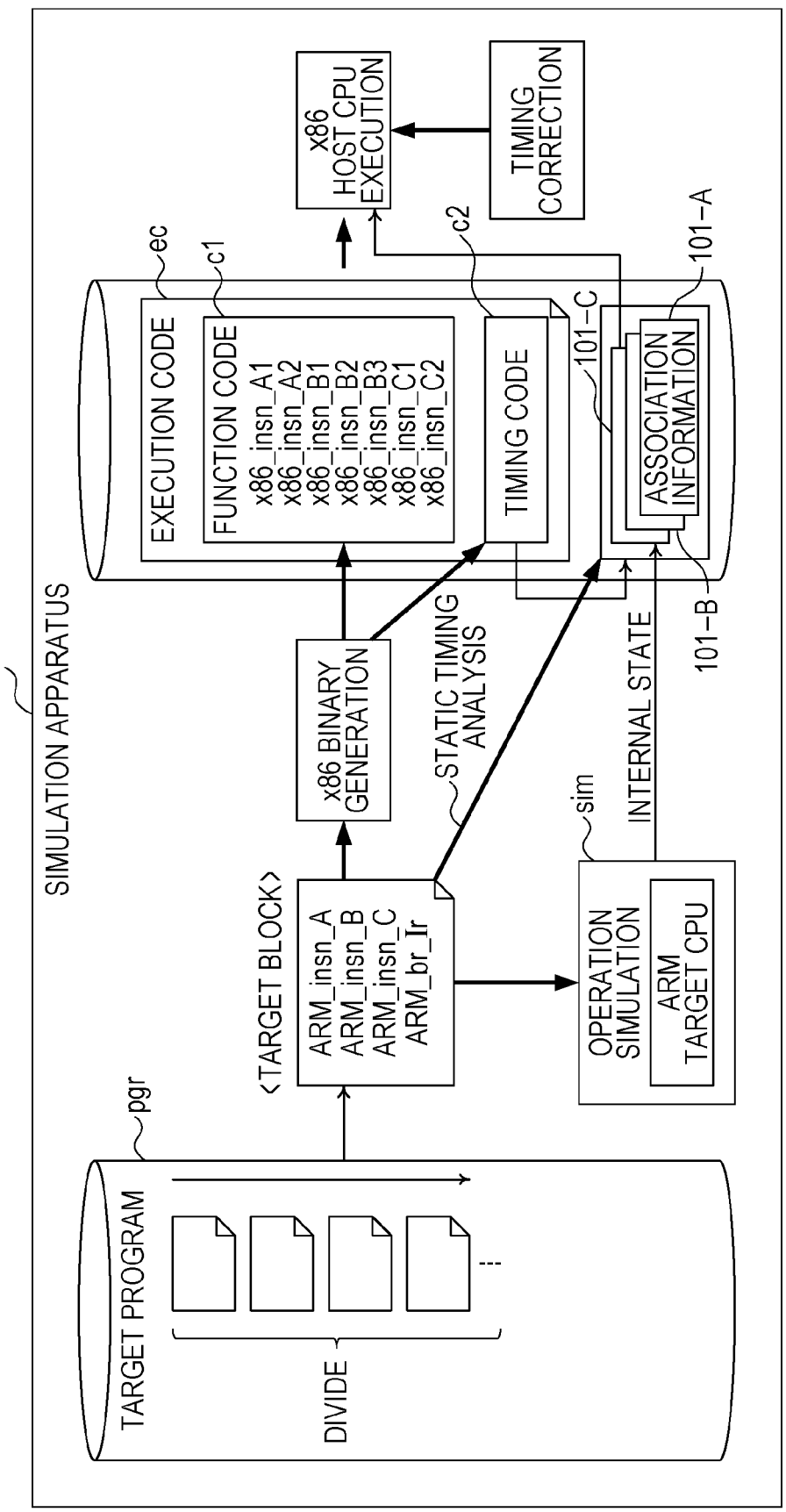
FIG. 13 is a block diagram illustrating an example of an operation performed by a simulation apparatus according to the first embodiment.

FIG. 13 is a block diagram illustrating an example of an operation performed by a simulation apparatus according to the first embodiment. The simulation apparatus 100 is a computer for executing the operation simulation sim when the out-of-order execution target CPU 1200 executes the target program pgr. When the target block in question has not become a target block in the past, the simulation apparatus 100 generates one execution code ec that allows performance values of the target block to be calculated based on the association information 101. Examples of the performance values include a processing time and the number of clocks. In addition, the simulation apparatus 100 generates an internal state of the target CPU 1200 in the operation simulation sim and association information 101 in which the internal state and the performance value of instructions in the internal state are associated with each other. In FIG. 13, "-alphabet" affixed to each piece of the association information 101 is information for identifying the internal state.

When the target block in question has become a target block in the past, the simulation apparatus 100 generates association information 101 for each internal state of the target CPU 1200 in the operation simulation sim. The association information 101 associates the internal state and the performance value of each instruction in the target block in the internal state. As a result, since the execution code ec for the target block is not generated a number of times, it is possible to reduce the amount of memory during estimation of performance values of the target block.

Also, when the detected internal state is the same as the internal state detected when the target block in question became in the past, the simulation apparatus 100 does not newly generate association information 101 in which the detected internal state is associated. Thus, since the association information 101 in which the same internal state is associated is not generated for the target block, it is possible to reduce the amount of memory during estimation of performance values of the target block.

(Example of Functional Configuration of Simulation Apparatus 100 According to First Embodiment)

Figure 14:
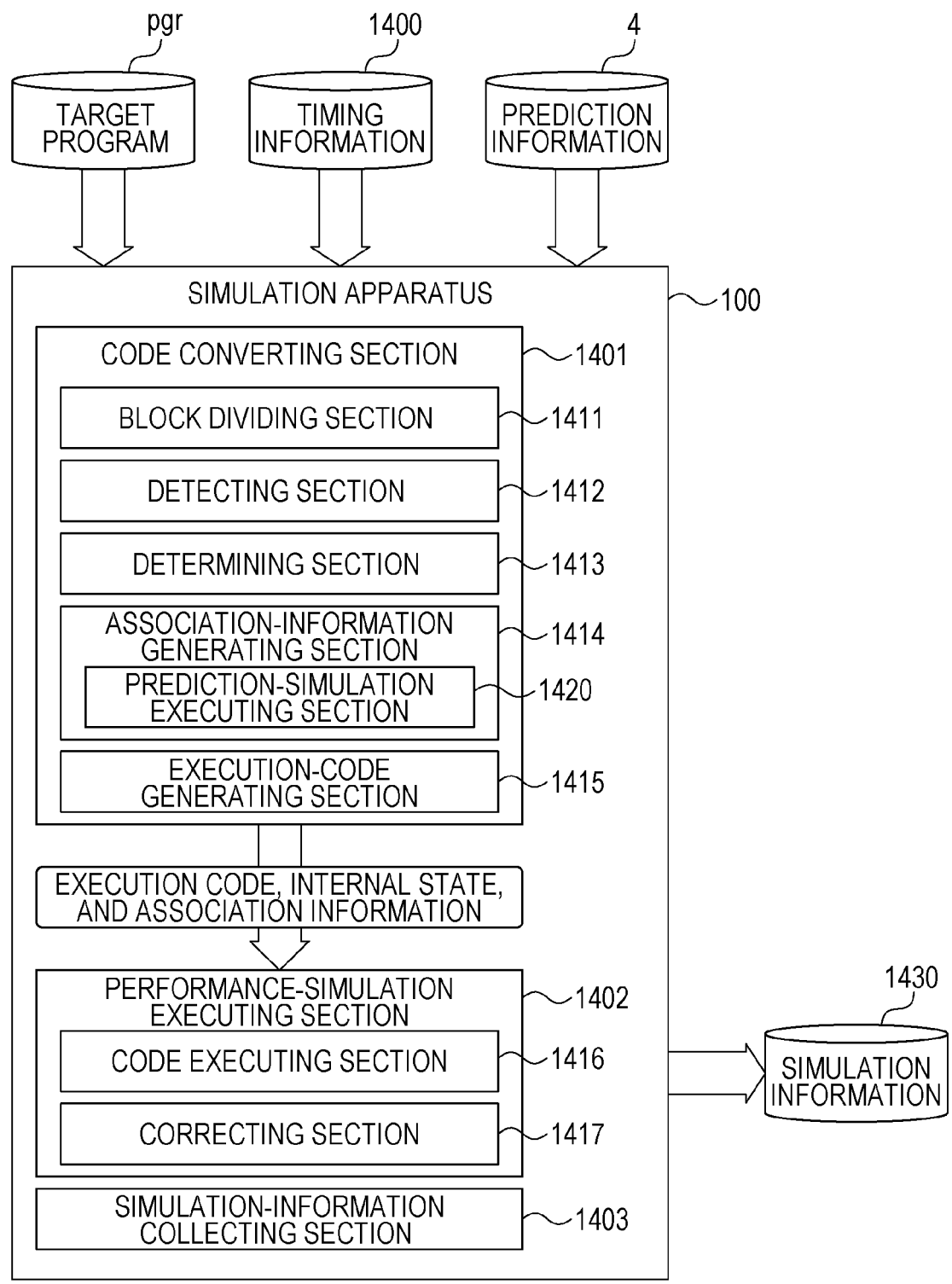
FIG. 14 is a block diagram illustrating an example of the functional configuration of the simulation apparatus according to the first embodiment.

FIG. 14 is a block diagram illustrating an example of the functional configuration of the simulation apparatus according to the first embodiment. The simulation apparatus 100 includes a code converting section 1401, a performance-simulation executing section 1402, and a simulation-information collecting section 1403. The simulation apparatus 100 obtains the target program pgr, timing information 1400, and the prediction information 4, and outputs simulation information 1430. The target program pgr, the timing information 1400, and the simulation information 1430 are stored in a storage device, such as the disk 205, in the simulation apparatus 100.

The processes of the code converting section 1401, the performance-simulation executing section 1402, and the simulation-information collecting section 1403 are coded into, for example, a simulation program stored in the storage device, such as the disk 205, accessible by the host CPU 201. The host CPU 201 then reads the simulation program stored in the storage device and executes the processes coded into the simulation program. In such a manner, the processes the code converting section 1401, the performance-simulation executing section 1402, and the simulation-information collecting section 1403 are accomplished. Processing results of the individual sections are stored in, for example, the storage device, such as the RAM 203 or the disk 205.

The code converting section 1401 generates association information 101 in which the internal state and the performance values of instructions in the target block are associated with each other and an execution code ec that allows performance values when the target CPU 1200 executes the target block to be determined based on the association information 101. More specifically, the code converting section 1401 includes a block dividing section 1411, a detecting section 1412, a determining section 1413, an association-information generating section 1414, and an execution-code generating section 1415.

The performance-simulation executing section 1402 executes the execution code ec to thereby determine performance values when the target CPU 1200 executes the target block. More specifically, the performance-simulation executing section 1402 includes a code executing section 1416 and a correcting section 1417.

The block dividing section 1411 divides the code of the target program pgr input to the simulation apparatus 100 into blocks according to a predetermined criterion. The timing at which the division is performed is, for example, when the target block changes. The unit of the block division may be, for example, a unit of a basic block or any predetermined unit of code.

Figure 15:
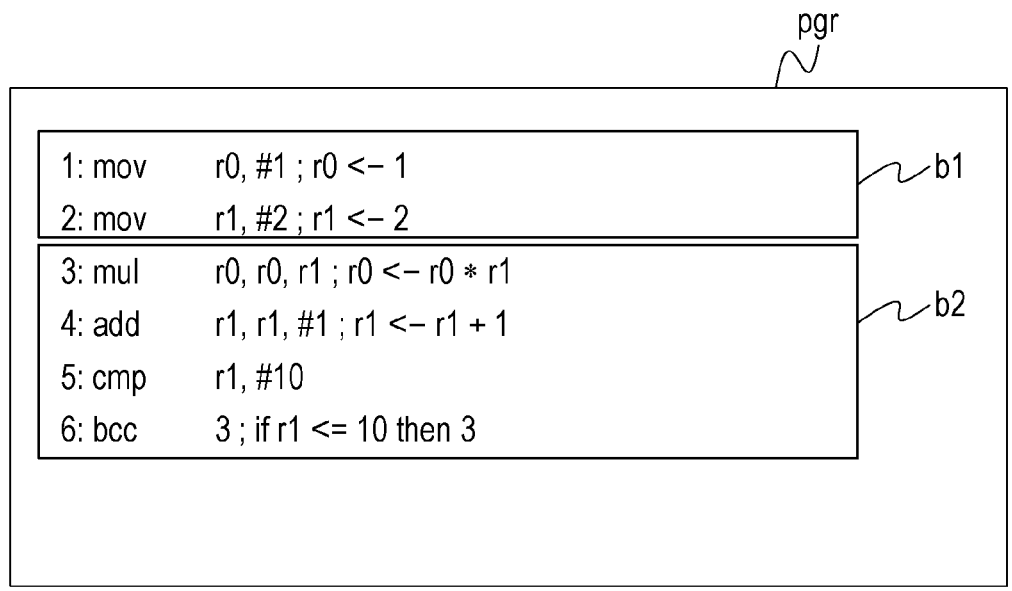
FIG. 15 is a block diagram illustrating an example of a target program.

FIG. 15 is a block diagram illustrating an example of the target program. The example illustrated in FIG. 15 is an example of a target program pgr for determining 1×2×3×4× 5×6×7×8×9×10. In the target program pgr, the first and second rows indicate a block b1 for initialization, and the third to sixth rows indicate a block b2 for a main portion of a loop.

First, when the target block in the operation simulation sim among the blocks obtained by dividing the code of the target program pgr changes, the detecting section 1412 detects the internal state of the target CPU 1200 in the operation simulation sim. More specifically, for example, when the value of the PC 1201 in the operation simulation sim indicates the address of an instruction included in a next block, the detecting section 1412 detects the internal state of the target CPU 1200 in the operation simulation sim. In this case, by way of example, it is assumed that the target block changes from one block to another block.

Figure 16:
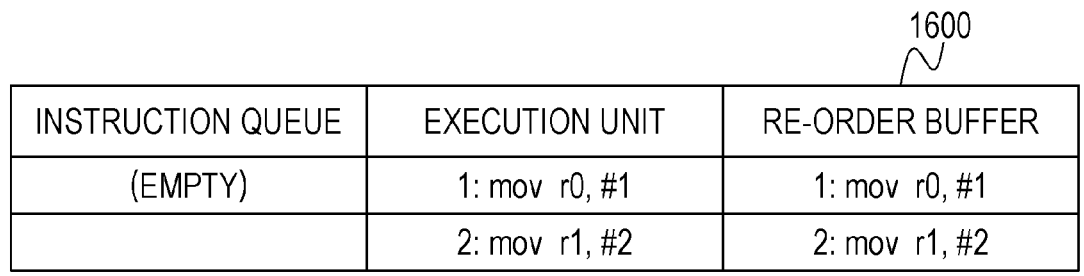
FIG. 16 is a table illustrating an example of an internal state of a target CPU.

FIG. 16 is a table illustrating an example of the internal state of the target CPU. For example, an internal state 1600 is a detection result when the contents of the instruction queue 1209, the execution unit 1206, and the re-order buffer 1207 are detected. The internal state 1600 indicates a state in which an instruction prior to the target block uses the execution unit 1206.

Next, when the target block changes, the determining section 1413 determines whether or not this target block in question has become a target block in the past. More specifically, for example, the determining section 1413 determines whether or not the execution code ec for the target block in question is stored in the storage device, such as the disk 205. When the target block in question has become a target block in the past, the target block has already been compiled. Thus, the execution code ec for the target block has been stored in the storage device, such as the disk 205. On the other hand, when the target block in question has not become a target block in the past, the target block has not been compiled yet, and thus an execution code ec for the target block has not been stored in the storage device, such as the disk 205.

When the determining section 1413 determines that the target block in question has not become a target block in the past, the execution-code generating section 1415 generates an execution code ec. On the other hand, when the determining section 1413 determines that the target block in question has become a target block in the past, the execution-code generating section 1415 does not generate an execution code ec. Thus, since the execution code ec for each block is not generated a number of times, the amount of memory during estimation of performance values of the target block can be reduced, compared with a case in which the execution code ec for the target block is generated for each internal state. For example, the timing code in the execution code ec includes a code for obtaining performance values from the association information 101 in which the internal state is associated and a code for calculating performance values when the target CPU 1200 executes the target block by using the obtained performance values.

FIG. 17 is a table illustrating an example of an execution code. FIG. 17 illustrates a case in which the execution code ec includes x86 instructions. The execution code ec includes a function code c1 and timing code c2 obtained as a result of compilation of the target program pgr. The function code c1 is written in the first to third rows and the eighth row in the execution code ec. The timing code c2 is written in the fourth to seventh rows in the execution code ec. The "state" in the execution code ec is an index (internal state A=0, B=1, . . . ) of the internal state of the target CPU 1200, and "perf1" indicates an address at which a performance value for the instruction 1 is stored. Thus, when the execution code ec is executed, the performance values of the instructions are obtained from the association information 101 in the order of execution by using the detected internal state as parameters.

The association-information generating section 1414 generates association information 101 in which the internal state detected by the detecting section 1412 and the performance values of instructions included in the target block in the detected internal state are associated with each other. The association-information generating section 1414 has a prediction-simulation executing section 1420. More specifically, the association-information generating section 1414 detects, from a group of instructions included in the target block, a status-dependent instruction that can be branched into processes in multiple combinations depending on the state during execution. The status-dependent instruction is an instruction for performing processing related to external hardware resources accessible by the target CPU 1200. More specifically, examples of the externally dependent instruction include a load instruction and a store instruction. The externally dependent instruction performs processing in which a result of the execution of the instruction depends on hardware resources external to the target CPU 1200. Examples of such processing include instruction cache, data cache, and TLB search. The status-dependent instruction is also an instruction for performing processing, such as branch prediction and call/return stack. The status-dependent instruction is the same as or similar to the above-described externally dependent instruction and is hereinafter referred to as an "externally dependent instruction".

With respect to a case in which the detected externally dependent instruction becomes a first process of the processes in multiple combinations, the prediction-simulation executing section 1420 performs static timing analysis by using the detected internal state and a performance value that serves as a reference for each instruction included in the target block. Thus, the association-information generating section 1414 determines a performance value of each instruction included in the target block when the externally dependent instruction becomes the first process of the multiple processes. The first process of the externally dependent instruction is a process defined by input prediction information. For example, the first process is a process that is presumed to have the highest probability of being the process among processes in multiple combinations. In this case, the first process is referred to as a "predicted case". The predicted case is assumed to be pre-registered in the prediction information 4. Since details of an example of the prediction information 4 are substantially the same as those of the prediction result in the simulation apparatus 100 when the target CPU 1200 is an in-order CPU, a detailed description thereof is not given. The prediction information 4 may be pre-stored in the storage device, such as the disk 205, may be input via the input device 207, or may be obtained from another apparatus through the network NET.

Performance values that serve as references are included in the input timing information 1400. The timing information 1400 includes a performance value that serves as a reference for each instruction included in the target program pgr and also includes a performance value for a penalty used by the correcting section 1417, as in the case of the timing information 3. The association-information generating section 1414 can determine the dependency relationship of instructions between the blocks, that is, the execution order of instructions or the like, based on the internal state. In the example of the internal state 1600 illustrated in FIG. 16, the association-information generating section 1414 can determine that the state of the target CPU 1200 is the state in which an instruction prior to the target block is using the execution unit 1206, and can determine the execution order of instructions. For example, the association-information generating section 1414 determines a performance value of each instruction included in the target block by adding/subtracting, in order of execution of the instructions depending on the internal state, a performance value to/from the performance value that serves as a reference of the instruction included in the target block.

The association-information generating section 1414 generates association information 101 in which, for example, the detected internal state and the performance value of each instruction included in the target block are associated with each other, the performance value being determined in the detected internal state. The generation association information 101 is newly added to a performance-value table for the target block, the performance-value table being stored in the storage device, such as the disk 205.

FIG. 18 is a table illustrating an example of a performance-value table according to the first embodiment. A performance-value table 1800 according to the first embodiment has fields for internal states, instructions included in corresponding blocks, and the performance values of the instructions in the corresponding internal states. Information is input to the fields, so that pieces of association information 101 (for example, 101-A and 101-B) are stored as records. The performance-value table 1800 can be implemented by the storage device, such as the disk 205.

In the association information 101-A for an internal state A, the performance value of an instruction 1 in the internal state A is 2 clocks. In the association information 101-B for an internal state B, the performance value of the instruction 1 in the internal state B is 4 clocks. Although FIG. 18 illustrates the performance value for only the instruction 1, for simplicity of illustration, the association information 101, in practice, includes the performance values of instructions included in the function code.

When the determining section 1413 determines that the target block in question has become a target block in the past, it determines that the detected internal state is the same as the internal state detected when the target block in question became a target block in the past. More specifically, by using the detected internal state as a search key, the determining section 1413 searches the performance-value table 1800 for the association information 101 having an internal state that matches the search key. For example, when association information 101 having an internal state that matches the search key is found, the determining section 1413 determines that the detected internal state is the same as the internal state when the target block in question became a target block in the past. For example, when the association information 101 having an internal state that matches the search key is not found, the determining section 1413 determines that the detected internal state is not the same as the internal state detected when the target block in question became a target block in the past.

When the determining section 1413 determines that the detected internal state is the same as the internal state detected when the target block in question became a target block in the past, the association-information generating section 1414 does not newly generate association information 101. On the other hand, when the determining section 1413 determines that the detected internal state is not the same as the internal state detected when the target block in question became a target block in the past, the association-information generating section 1414 newly generates association information 101 based on the detected internal state. The association information 101 associates the newly detected internal state and the performance values of instructions in the target block in the detected internal state. With this arrangement, even when the same internal state is detected a number of times for the target block, the association information 101 for the same internal state is generated only once, and thus it is possible to reduce the amount of memory during estimation of performance values of the target block.

The code executing section 1416 executes the execution code ec generated by the execution-code generating section 1415. By executing the execution code ec, the performance-simulation executing section 1402 determines performance values when the target CPU 1200 executes the target block. More specifically, the performance-simulation executing section 1402 includes the code executing section 1416 and the correcting section 1417, as described above.

The code executing section 1416 executes the execution code ec by using the association information 101 generated by the association-information generating section 1414. When it is determined that the target block in question became a target block in the past and the detected state is the same as the internal state when the target block in question became a target block, the code executing section 1416 obtains the association information 101 in which the internal state detected when the target block in question became a target block in the past. The code executing section 1416 then executes the execution code ec by using the detected internal state and the obtained association information 101.

When an externally dependent instruction is detected while the code executing section 1416 is executing the execution code ec, the correcting section 1417 determines whether or not the externally dependent instruction is, in an execution result in the operation simulation sim, a second process that is different from the first process that is a predicted case of the processes in multiple combinations. When the externally dependent instruction is the second process in the execution result in the operation simulation sim, the correcting section 1417 corrects the performance value of the externally dependent instruction by using a predetermined performance value for the second process. The predetermined performance value is a penalty performance value included in the timing information 1400 and is determined in advance in accordance with the type of externally dependent instruction and the second process. Through the above-described processing, the correcting section 1417 corrects the performance value when the target CPU 1200 executes the target block. Since a detailed method of the correction performed by the correcting section 1417 is substantially the same as that in the simulation apparatus 1 when the target CPU 1200 is an in-order CPU, a detailed description is not given hereinafter.

The simulation-information collecting section 1403 collects simulation information 1430, which is log information including the execution time of each instruction as an execution result of the performance-simulation executing section 1402. The simulation information 1430 may be stored in the storage device, such as the disk 205, may be output via the output device 208, such as a display, or may be output to another apparatus through the network NET.

(Example of Procedure of Simulation Processing Performed by Simulation Apparatus 100 According to First Embodiment)

Figure 19:
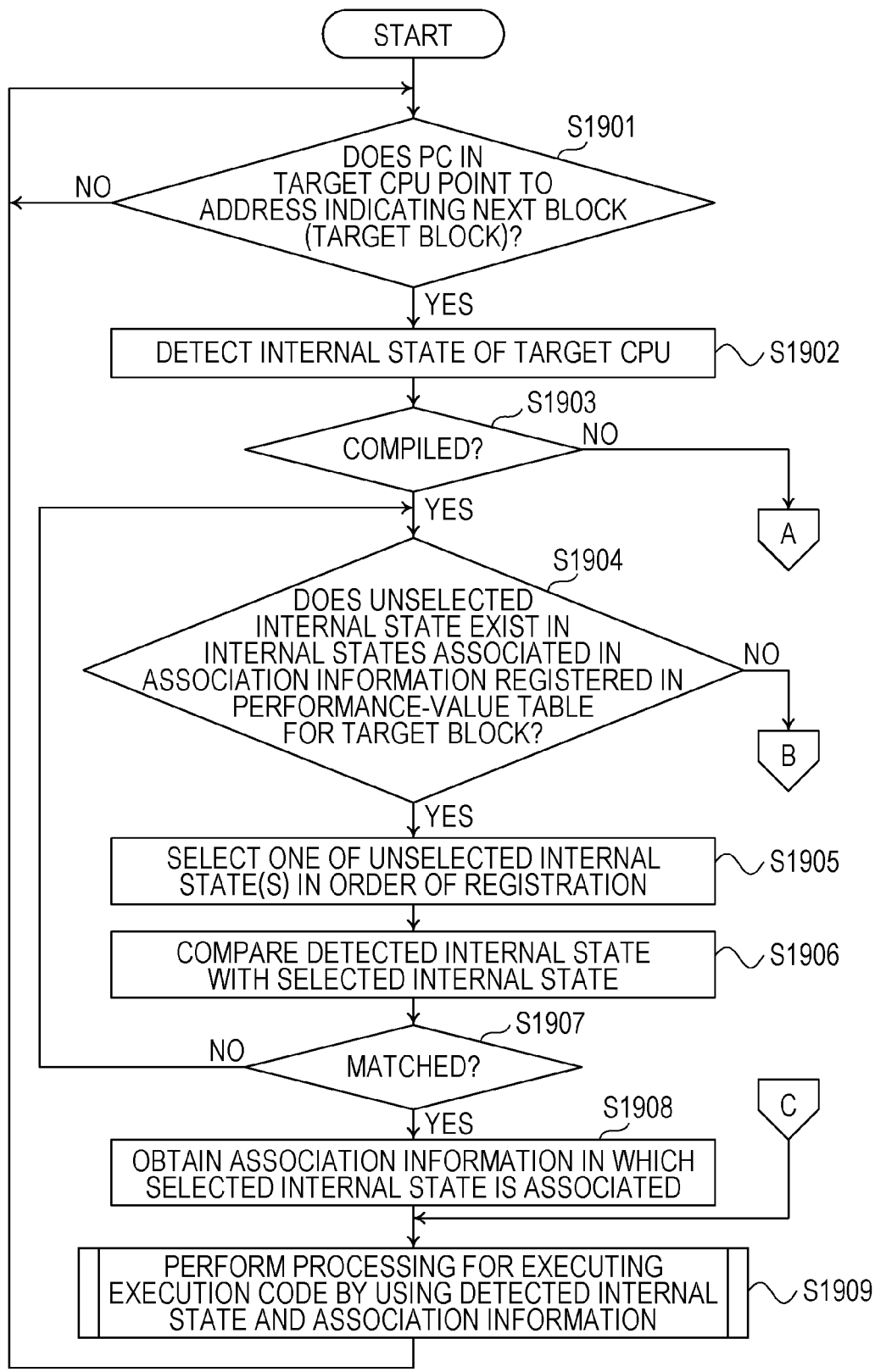
FIG. 19 is a flowchart (part 1) illustrating an example of a procedure of simulation processing performed by the simulation apparatus.
Figure 20:
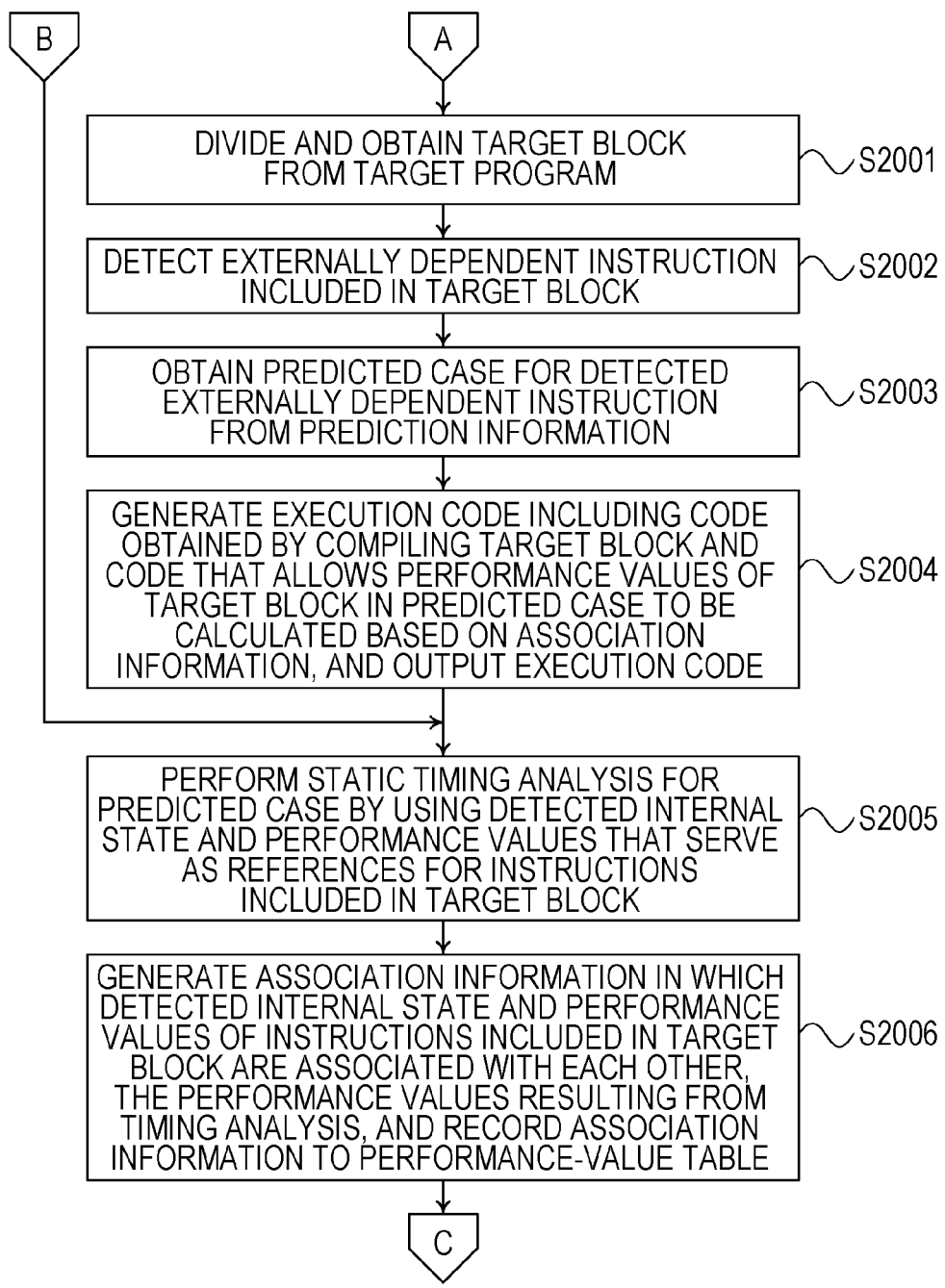
FIG. 20 is a flowchart (part 2) illustrating the example of the procedure of the simulation processing performed by the simulation apparatus.

FIGS. 19 and 20 are flowcharts illustrating an example of a procedure of the simulation processing performed by the simulation apparatus 100. First, the simulation apparatus 100 determines whether or not the PC 1201 in the target CPU 1200 points to an address indicating a next block (a next target block) (step S1901). The simulation apparatus 100 determines whether or not the target block has changed in step S1901.

When the PC 1201 does not point to an address indicating a next block (a next target block) (NO in step S1901), the process of the simulation apparatus 100 returns to step S1901. On the other hand, when the PC 1201 points at an address indicating a next block (a next target block) (YES in step S1901), the simulation apparatus 100 detects the internal state of the target CPU 1200 (step S1902). Next, the simulation apparatus 100 determines whether or not the target block has already been compiled (step S1903).

Upon determining that the target block has not been compiled (NO in step S1903), the simulation apparatus 100 divides and obtains the target block from a target program pgr (step S2001). The simulation apparatus 100 detects an externally dependent instruction included in the target block (step S2002) and obtains, from the prediction information 4, a predicted case for the detected externally dependent instruction (step S2003). The simulation apparatus 100 generates an execution code ec including a code obtained by compiling the target block and a code that allows performance values of the target block in the predicted case to be calculated based on the association information 101, and outputs the execution code ec (step S2004). The "performance values of the target block in the predicted case" refer to the performance values of the target block when the result of a detected externally dependent instruction matches the obtained predicted case.

The simulation apparatus 100 performs static timing analysis for the predicted case by using the detected internal state and the performance values serving as references for the instructions included in the target block (step S2005). The simulation apparatus 100 generates association information 101 in which the detected internal state and the performance values of the instructions included in the target block, the performance values resulting from the timing analysis, are associated with each other, and records the association information 101 to the performance-value table 1800 (step S2006). The process then proceeds to step S1909.

When it is determined that the target block has already been compiled (YES in step S1903), the simulation apparatus 100 determines whether or not any unselected internal state exists in the internal states associated in the association information 101 for the target block, the association information being registered in the performance-value table 1800 (step S1904). When any unselected internal state exists (YES in step S1904), the simulation apparatus 100 selects one of the unselected internal state(s) in order of registration (step S1905).

The simulation apparatus 100 compares the detected internal state with the selected internal state (step S1906). The simulation apparatus 100 then determines whether or not the internal states match each other (step S1907). Upon determining that the internal states match each other (YES in step S1907), the simulation apparatus 100 obtains, from the performance-value table 1800, the association information 101 in which the selected internal state is associated (step S1908). By using the detected internal state and the obtained association information 101, the simulation apparatus 100 performs processing for executing the execution code ec (step S1909). The process then returns to S1901. On the other hand, upon determining that the internal states do not match each other (NO in step S1907), the process of the simulation apparatus 100 returns to step S1904. On the other hand, when no unselected internal state exists (NO in step S1904), the process of the simulation apparatus 100 proceeds to step S2005.

Figure 21:
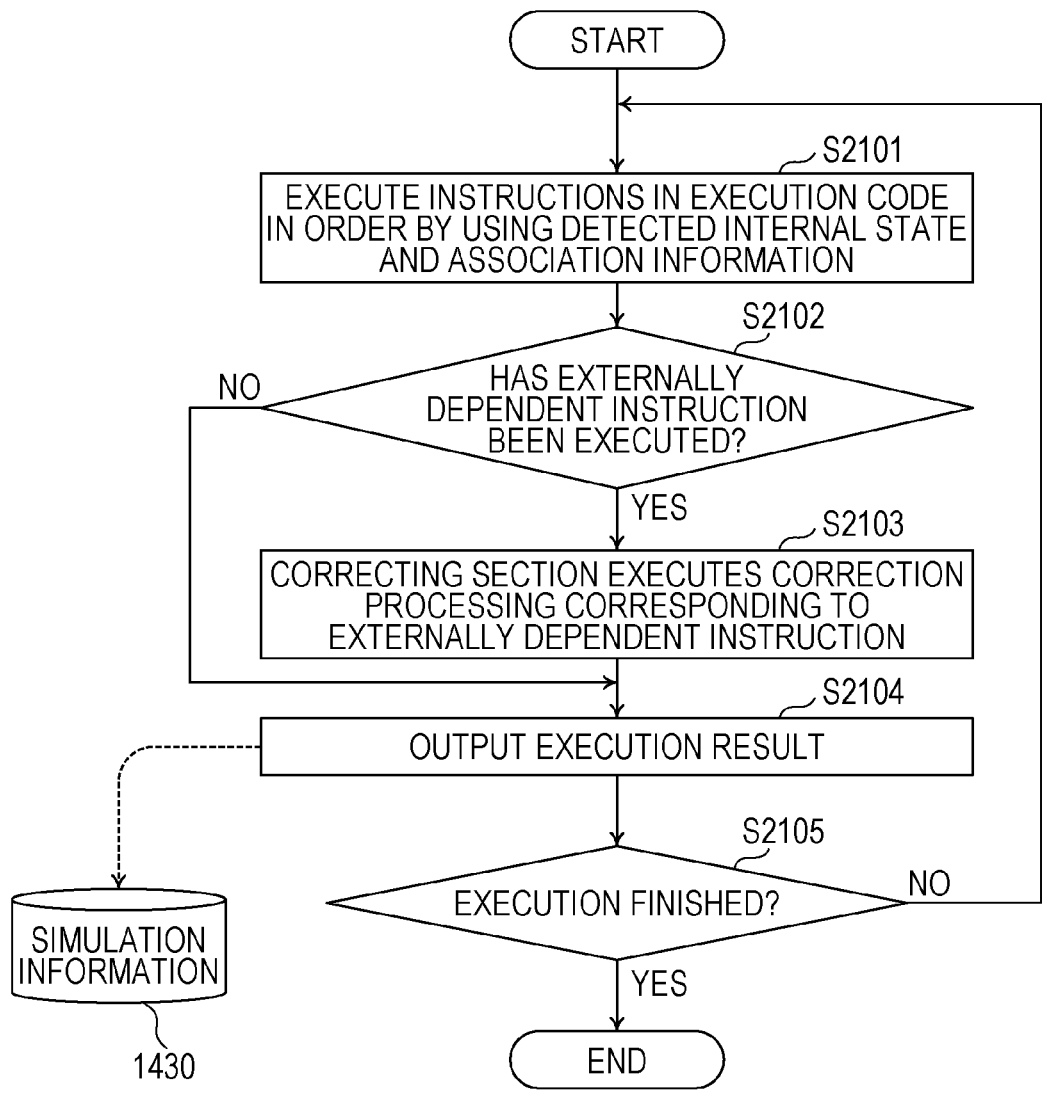
FIG. 21 is a flowchart illustrating details of the execution processing illustrated in FIG. 19.

FIG. 21 is a flowchart illustrating details of the execution processing illustrated in FIG. 19. By using the detected internal state and the association information 101, the simulation apparatus 100 executes the instructions in the execution code ec in order (step S2101). The simulation apparatus 100 determines whether or not an externally dependent instruction included in the target block has been executed (step S2102).

Upon determining that an externally dependent instruction included in the target block has not been executed (NO in step S2102), the process of the simulation apparatus 100 proceeds to step S2104.

When an externally dependent instruction included in the target block has been executed (YES in step S2102), the correcting section 1417 in the simulation apparatus 100 executes correction processing corresponding to the externally dependent instruction (step S2103). The simulation apparatus 100 then outputs an execution result (step S2104). Next, the simulation apparatus 100 determines whether or not the execution of instructions included in the target block has been finished (step S2105). Upon determining that the execution of the instructions has been finished (YES in step S2105), the simulation apparatus 100 ends the series of processes. On the other hand, when it is determined that the execution of the instructions has not been finished (NO in step S2105), the process returns to step S2101.

Figure 22:
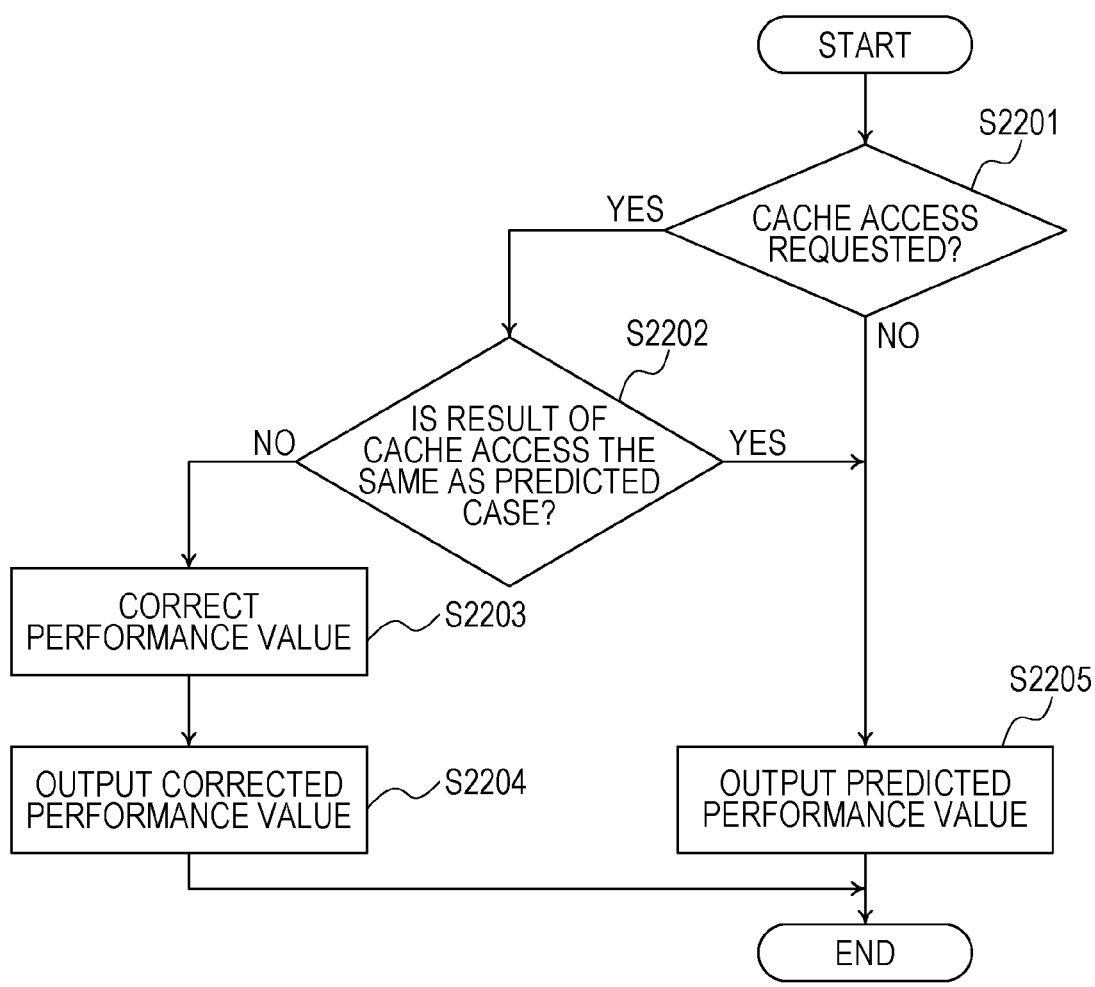
FIG. 22 is a flowchart illustrating details of the correction processing performed by the correcting section and illustrated in FIG. 21.

FIG. 22 is a flowchart illustrating details of the correction processing performed by the correcting section and illustrated in FIG. 21. The correcting section 1417 may be a helper function. Now, a description will be given of an example of a helper function as to whether or not cache access for the ld instruction is "hit".

First, the simulation apparatus 100 determines whether or not cache access is requested (step S2201). When no cache access is requested (NO in step S2201), the process proceeds to step S2205. When cache access is requested (YES in step S2201), the simulation in step S2203 is the operation simulation sim. The simulation apparatus 100 determines whether or not a result of the cache access is the same as the predicted case (step S2202).

Upon determining that the result is not the same as the predicated case (NO in step S2202), the simulation apparatus 100 corrects the performance value (step S2203). The simulation apparatus 100 then outputs the corrected performance value (step S2204) and ends the series of processes. Upon determining that the result is not the same as the predicated case (YES in step S2202), the simulation apparatus 100 outputs a predicted performance value included in the association information 101 (step S2205) and ends the series of processes.

As described above, the simulation apparatus 100 according to the first embodiment generates association information 101 in which the detected internal state of the CPU and the performance values of instructions in the internal state are associated with each other and executes the execution code ec that allows performance values of the block to be calculated based on the association information 101. Since the performance-value estimation taking the internal state into account can be performed, it is possible to enhance the accuracy of estimating performance values in out-of-order execution.

The simulation apparatus 100 according to the first embodiment also generates, for each detected internal state of the CPU, association information 101 in which the internal state and the performance values of instructions in the internal state are associated with each other and generates one execution code ec that allows performance values of the block to be calculated based on the association information 101. As a result, since the execution code ec is not generated a number of times, it is possible to reduce the amount of memory during estimation of performance values of a block.

When association information 101 in which the detected internal state of the CPU is associated is already available, the simulation apparatus 100 according to the first embodiment does not newly generate association information 101. With this arrangement, since the association information 101 in which the internal state is associated with respect to the target block is not generated a number of times, it is possible to reduce the amount of memory during estimation of performance values of a block.

(Second Embodiment)

In a second embodiment, association information generated when a second block, which is to be executed immediately after the first block, was previously executed is linked with association information in which an internal state and performance values with respect to the first block are associated with each other. With this arrangement, it is possible to increase the speed of processing involved in searching the performance-value table for the association information in which the detected internal state is associated. FIG. 25 illustrates a performance-value table according to the second embodiment. In the second embodiment, elements and functions described above in the first embodiment are denoted by the same reference numerals, and detailed descriptions thereof are not given hereinafter.

Figure 23:
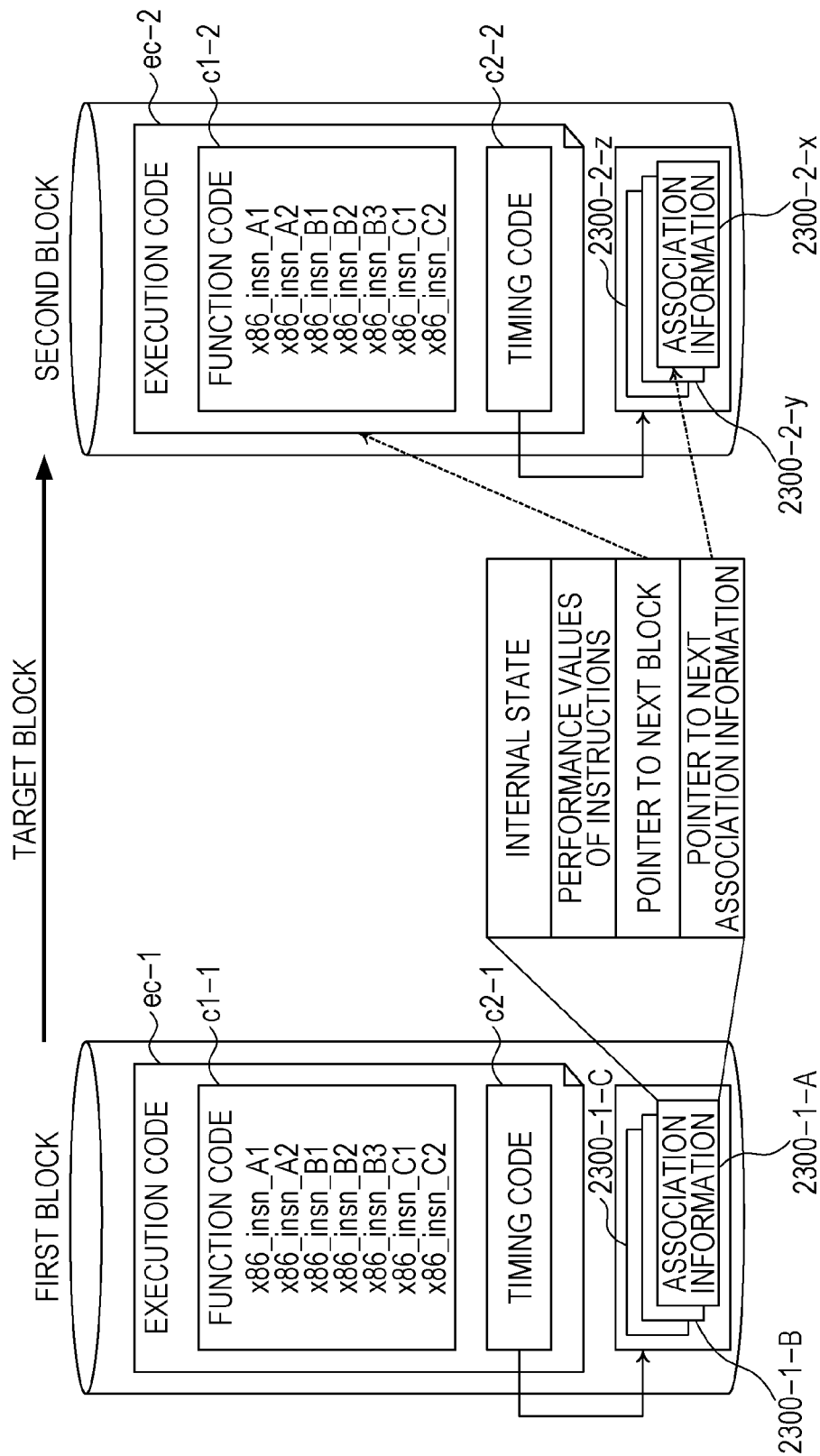
FIG. 23 is a block diagram illustrating an example of an operation performed by a simulation apparatus according to a second embodiment.

FIG. 23 is a block diagram illustrating an example of an operation performed by the simulation apparatus according to the second embodiment. The simulation apparatus 100 pre-links association information 2300 generated when a second block, which is to be executed immediately after the first block, was previously executed with association information 2300 in which an internal state and performance values with respect to the first block are associated with each other. More specifically, each piece of association information 2300 has an internal state, performance values, a pointer to a next block, and a pointer to a next piece of association information 2300. The pointer to the next block is an address indicating a storage area in which an execution code ec for the next block is stored. The pointer to the next piece of association information 2300 is an address indicating a storage area in which the generated piece of the association information 2300 for the next block is stored. In the example illustrated in FIG. 23, "-number" affixed to each of the execution code ec, the function code c1, the timing code c2, and the association information 2300 indicates to which block the association information belongs.

In the example illustrated in FIG. 23, "-alphabet" affixed to each piece of the association information 2300 is information for identifying the internal state. In the example in FIG. 23, a pointer to an execution code ec-2 for a second block is set as a pointer to a next block, the pointer being included in association information 2300-1-A. In addition, association information 2300-2-x for the second block is set as a pointer to next association information, the pointer being included in the association information 2300-1-A.

The simulation apparatus 100 determines whether or not the internal state detected when the second block newly becomes a target block matches the internal state associated in the association information 2300 for the second block, the association information 2300 being linked with the association information 2300 for the first block. When the internal states match each other, the simulation apparatus 100 executes the execution code ec for the second block by using the linked association information 2300. With this arrangement, since the association information 2300 that is highly likely to be used is linked, it is possible to increase the speed of processing involved in searching the performance-value table for the association information 2300 in which the detected internal state is associated.

(Example of Functional Configuration of Simulation Apparatus 100 According to Second Embodiment)

Figure 24:
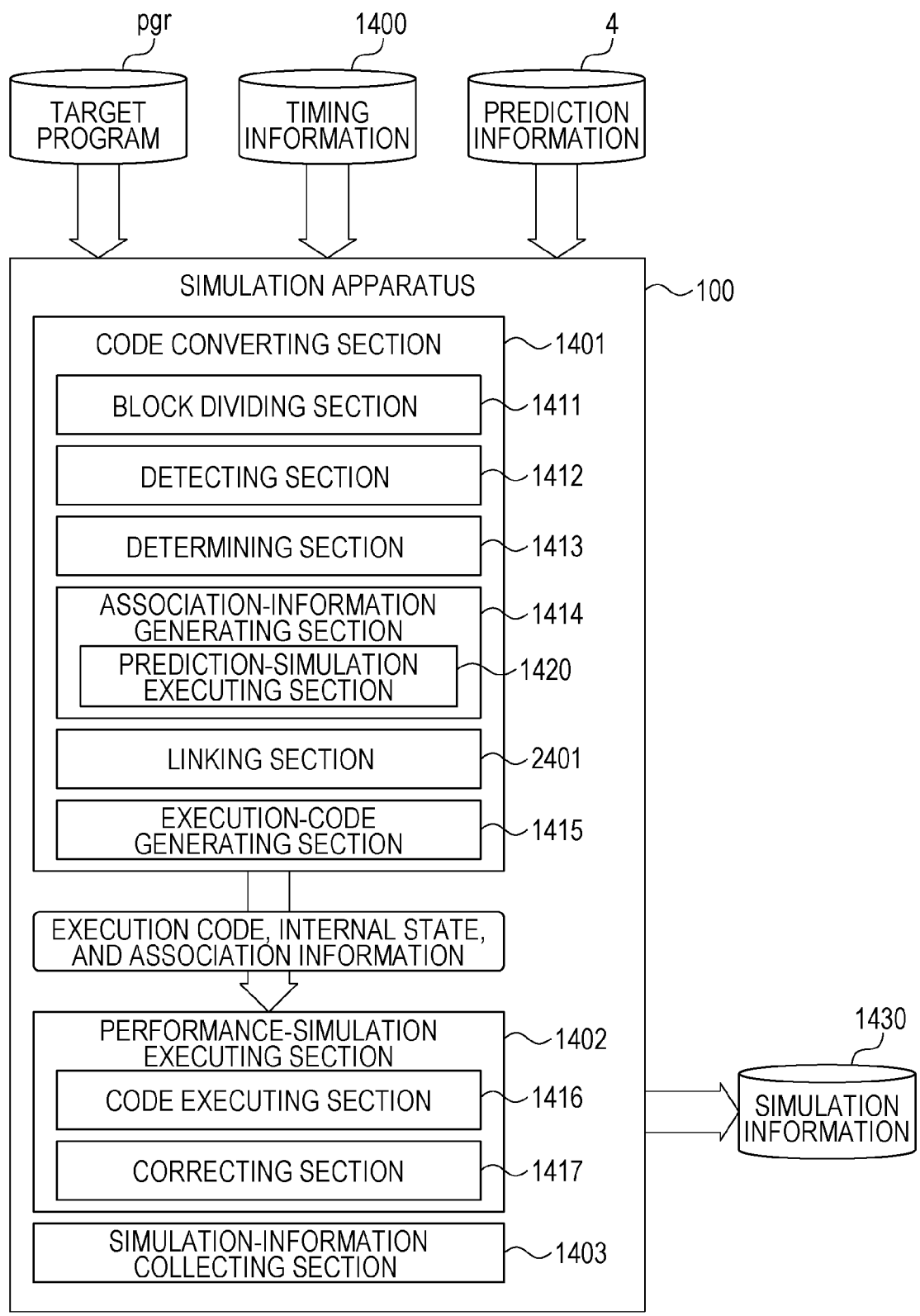
FIG. 24 is a block diagram illustrating an example of the functional configuration of the simulation apparatus according to the second embodiment.

FIG. 24 is a block diagram illustrating an example of the functional configuration of the simulation apparatus according to the second embodiment. The simulation apparatus 100 includes a code converting section 1401, a performance-simulation executing section 1402, and a simulation-information collecting section 1403. The simulation apparatus 100 obtains the target program pgr, the timing information 1400, and the prediction information 4 and outputs simulation information 1430.

Processes of the code converting section 1401, the performance-simulation executing section 1402, and the simulation-information collecting section 1403 are coded into, for example, a simulation program stored in the storage device, such as the disk 205, accessible by the CPU. The CPU then reads the simulation program stored in the storage device and executes the processes encoded into the simulation program. This realizes the processes of the code converting section 1401, the performance-simulation executing section 1402, and the simulation-information collecting section 1403.

The code converting section 1401 generates association information 2300 in which the internal state and the performance values are associated with each other and an execution code ec that allows performance values when the target CPU 1200 executes the target block to be determined using the association information 2300. More specifically, the code converting section 1401 includes a block dividing section 1411, a detecting section 1412, a determining section 1413, an association-information generating section 1414, an execution-code generating section 1415, and a linking section 2401.

By executing the execution code ec, the performance-simulation executing section 1402 determines performance values when the target CPU 1200 executes the target block. More specifically, the performance-simulation executing section 1402 includes a code executing section 1416 and a correcting section 1417.

When the target block changes from a first block to a second block, the linking section 2401 links the generated association information 2300 for the second block with the generated association information 2300 for the first block. More specifically, the linking section 2401 links the pointer to the second block and the pointer to the association information 2300 for the second block, the association information 2300 being generated by the association-information generating section 1414, with the association information 2300 for the first block.

FIG. 25 is a block diagram illustrating an example of a performance-value table according to the second embodiment. A performance-value table 2500 according to the second embodiment has fields for internal states, instructions, performance values, pointers to next blocks, and pointers to next association information. As a result of setting information in the fields, the association information 2300 is stored as a record.

Since the fields of the internal states, the instructions, and the performance values are the same as or similar to those in the first embodiment, detailed descriptions thereof are not given hereinafter. A pointer to a block that became a target block next after a block in question became a target block in the past is set in the "pointer to next block" field. A pointer to the association information 2300 used when a block in question became a next target block in the past is set in the "pointer to next association information" field. For example, the association-information generating section 1414 sets "null" for the field of the pointer to the next target block and the field of the pointer to the next association information 2300, the pointers being included in the association information 2300 to be generated.

In association information 2300-A, "0x80005000" is set in the "pointer to next block" field and "0x80006000" is set in the "pointer to next association information" field. In association information 2300-B, "0x80001000" is set in the "pointer to next block" field and "0x80001500" is set in the "pointer to next association information" field.

For example, an offset to the next association information 2300 may also be set in the "pointer to next association information" field. For example, the offset is a difference between the pointer to the next block and the pointer to the next association information 2300. For example, in the association information 2300-A "0x80005000" is set in the "pointer to next block" field and "0x1000" is set in the "pointer to next association information" field. With this arrangement, it is determined that the pointer to the next association information 2300 is "0x80006000". For example, in the case of the association information 2300-B, "0x80001000" is set in the "pointer to next block" field and "0x500" is set in the "pointer to next association information" field. Thus, it is determined that the pointer to the next association information is "0x80001500". Since the offset to the next association information 2300 is set, the amount of information of the association information 2300 can be reduced and the amount of memory to be used can be reduced.

When the target block in question changes from a third block to a fourth block, the determining section 1413 determines whether or not the target block in question has also changed from the third block to the fourth block in the past. More specifically, the determining section 1413 determines whether or not the point to the next block, the pointer being included in the association information 2300 for the third block, matches the pointer to the fourth block. Upon determining that the pointer to the next block does not match the pointer to the fourth block, the determining section 1413 determines that the target block in question has not changed from the third block to the fourth block in the past, and determines whether or not the fourth block has become a target block in the past, as in the first embodiment. Processing performed after the determination as to whether or not the fourth block has become a target block in the past is similar to the processing in the first embodiment.

On the other hand, upon determining that the pointer to the next block matches the pointer to the fourth block, the determining section 1413 determines that the target block in question has also changed from the third block to the fourth block in the past. The determining section 1413 determines whether or not the internal state associated in the associated association information 2300 linked with the association information 2300 for the fourth block when the fourth block became a target block in the past matches the internal state detected for the fourth block. The determining section 1413 determines whether or not the internal state associated in the association information 2300 indicated by the pointer to the next association information, the pointer being included in the association information 2300 for the third block, matches the internal state detected for the fourth block by the detecting section 1412.

Upon determining that the internal states do not match each other, the determining section 1413 determines whether or not the fourth block has become a target block in the past, as in the first embodiment. Since processes after the determination as to whether or not the fourth block has become a target block in the past are the same as or similar to those in the first embodiment, detailed descriptions thereof are not given.

On the other hand, when the determining section 1413 determines that the internal states match each other, the performance-simulation executing section 1402 executes the execution code ec for the fourth block by using the association information 2300 linked with the association information 2300 generated for the third block.

With this arrangement, since the association information 2300 that is highly likely to be used is linked, it is possible to increase the speed of processing involved in searching the performance-value table 2500 for the association information 2300 in which the detected internal state is associated.

(Example of Procedure of Simulation Processing Performed by Simulation Apparatus 100 According to Second Embodiment)

Figure 26:
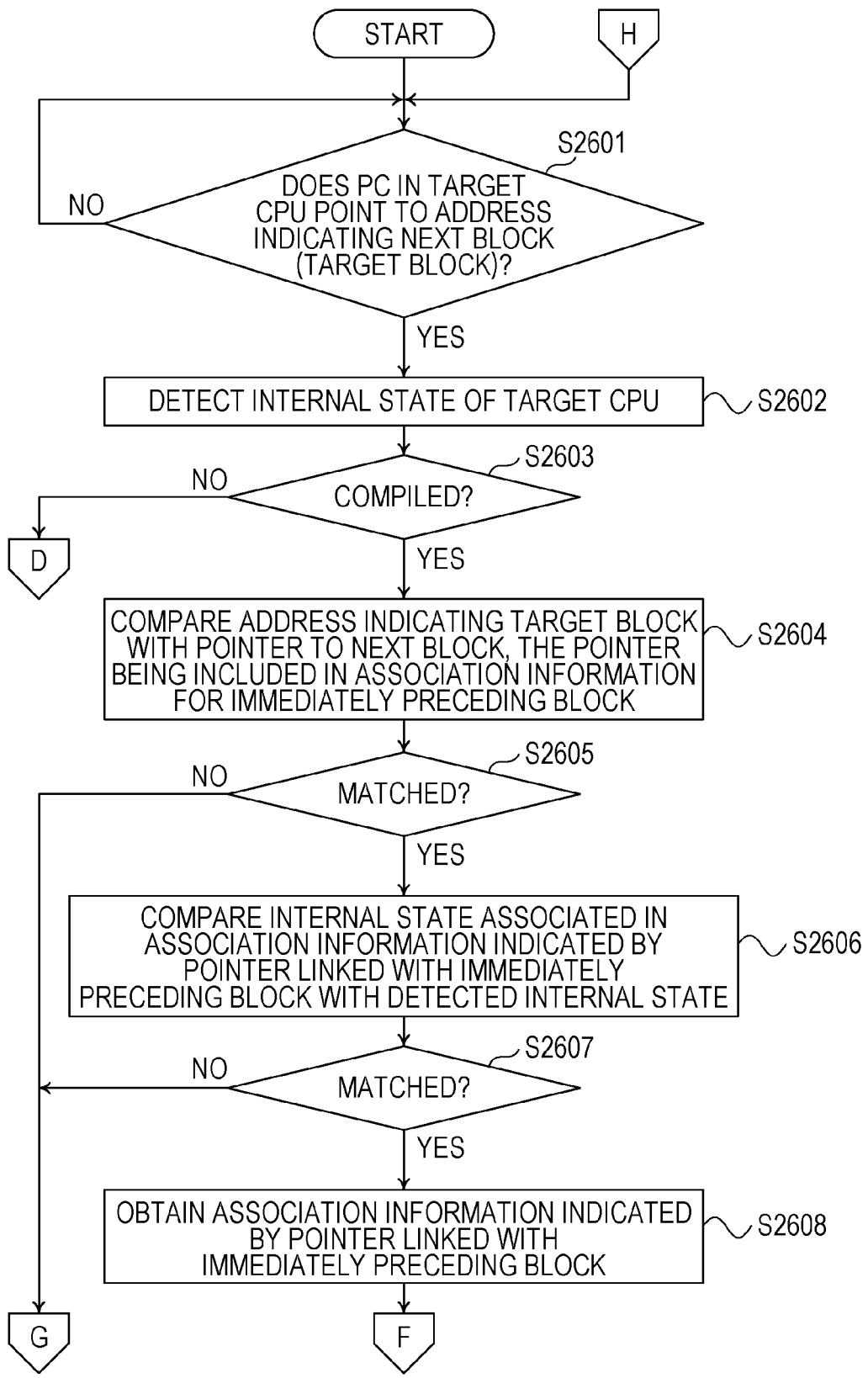
FIG. 26 is a flowchart (part 1) illustrating an example of a procedure of simulation processing performed by the simulation apparatus according to the second embodiment.
Figure 27:
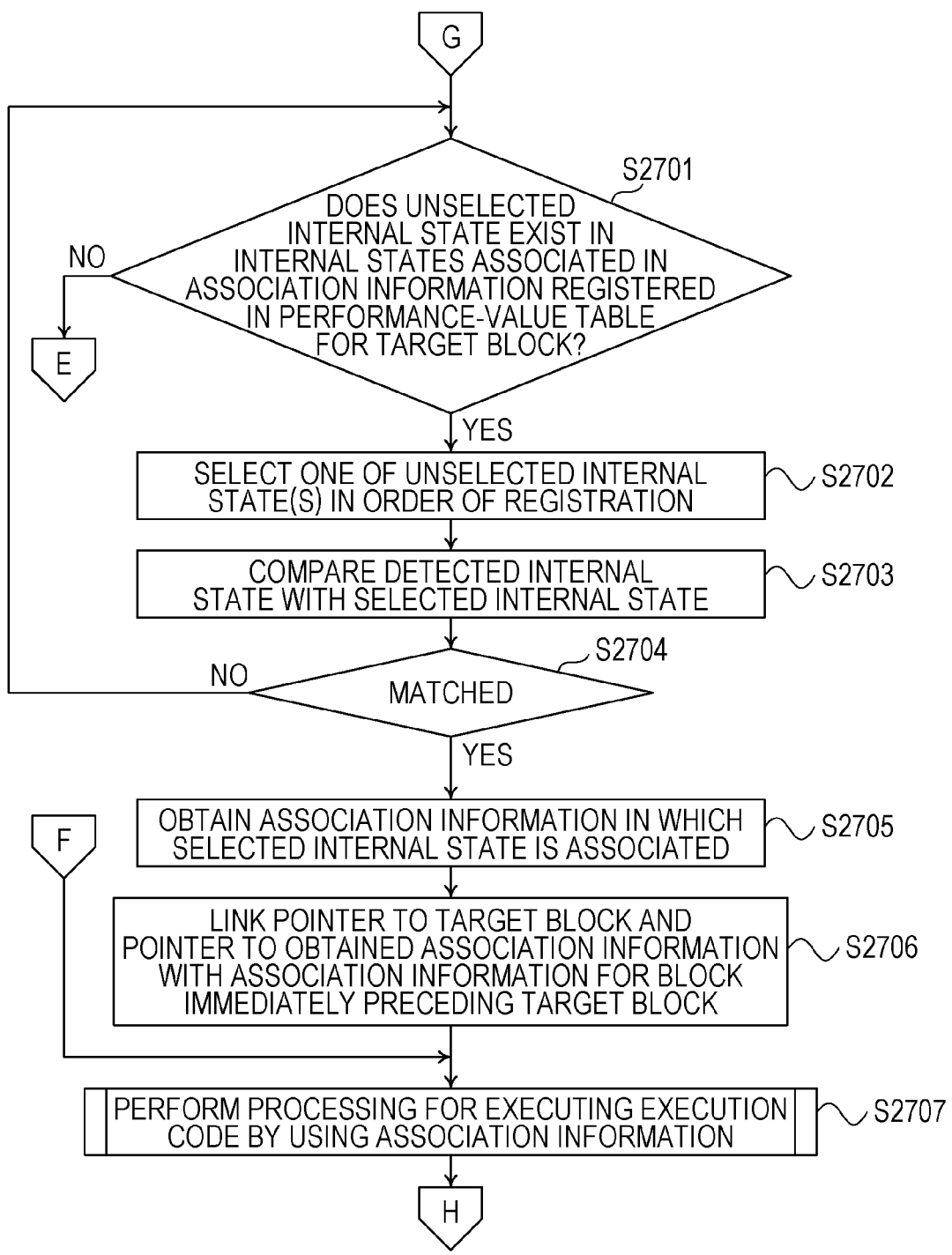
FIG. 27 is a flowchart (part 2) illustrating the example of the procedure of the simulation processing performed by the simulation apparatus according to the second embodiment.

FIGS. 26 to 28 are flowcharts illustrating an example of a procedure of the simulation processing performed by the simulation apparatus according to the second embodiment. First, the simulation apparatus 100 determines whether or not the PC 1201 in the target CPU 1200 points to an address indicating a next block (a next target block) (step S2601). The simulation apparatus 100 determines whether or not the target block has changed in step S2601.

When the PC 1201 in the target CPU 1200 does not point to an address indicating the next block (the next target block) (NO in step S2601), the process of the simulation apparatus 100 returns to step S2601. On the other hand, when the PC 1201 in the target CPU 1200 points to an address indicating the next block (the next target block) (YES in step S2601), the simulation apparatus 100 detects the internal state of the target CPU 1200 (step S2602). Next, the simulation apparatus 100 determines whether or not the target block has already been compiled (step S2603).

Upon determining that the target block has not been compiled (NO in step S2603), the simulation apparatus 100 divides and obtains the target block from the target program pgr (step S2801). The simulation apparatus 100 detects an externally dependent instruction included in the target block (step S2802) and obtains, from the prediction information 4, a predicted case for the detected externally dependent instruction (step S2803). The simulation apparatus 100 generates an execution code ec including a code obtained by compiling the target block and a code that allows performance values of the target block in the predicted case to be calculated based on the association information 2300, and outputs the generated execution code (step S2804). The "performance values of the target block in the predicted case" refer to performance values of the target block when the result of a detected externally dependent instruction matches the obtained predicted case.

The simulation apparatus 100 performs static timing analysis for the predicted case by using the detected internal state and performance values that serve as references for the instructions included in the target block (step S2805). The simulation apparatus 100 generates association information 2300 in which the detected internal state and performance values of instructions included in the target block, the performance values resulting from the timing analysis, are associated with each other, and records the generated association information 2300 to the performance-value table 2500 (step S2806). The simulation apparatus 100 then links the pointer to the target block and the pointer to the generated association information 2300 with the association information 2300 for the block immediately preceding the target block (step S2807). The process then proceeds to step S2707. The association information 2300 for the block immediately preceding the target block is the association information 2300 used for determining the performance values of the block immediately preceding the target block.

When the target block has already been compiled (YES in step S2603), the simulation apparatus 100 compares an address indicating the target block with the pointer to the next block, the pointer being included in the association information 2300 for the immediately preceding block (step S2604). The "address indicating the target block" refers to, in a storage area, an address at which the execution code ec for the target block is stored. The simulation apparatus 100 determines whether or not the address indicating the target block and the pointer to the next block, the pointer being included in the association information 2300 for the immediately preceding block, match each other (step S2605). Upon determining that they match each other (YES in step S2605), the simulation apparatus 100 compares the internal state, associated in the association information 2300 indicated by the pointer linked with the immediately preceding block, with the detected internal state (step S2606).

The simulation apparatus 100 determines whether or not the internal state associated in the association information 2300 indicated by the pointer linked with the immediately preceding block and the detected internal state match each other (step S2607). Upon determining that they match each other (YES in step S2607), the simulation apparatus 100 obtains the association information 2300 indicated by the pointer linked with the immediately preceding block and the process proceeds to step S2707 (step S2608).

On the other hand, when it is determined that the address and the pointer do not match each other (NO in step S2605) or the internal states do not match each other (NO in step S2607), the process of the simulation apparatus 100 proceeds to step S2701. The simulation apparatus 100 determines whether or not an unselected internal state exists in the internal states associated in the association information 2300 registered in performance-value table 2500 for the target block (step S2701).

When no unselected internal state exists (NO in step S2701), the process proceeds to step S2805. As a result, the association information 2300 is generated for each internal state detected for the target block and an execution code ec for the target block is generated only once.

When any unselected internal state exists (YES in step S2701), the simulation apparatus 100 selects one of the unselected internal state(s) in order of registration (step S2702). The simulation apparatus 100 compares the detected internal state with the selected internal state (step S2703). The simulation apparatus 100 then determines whether or not the detected internal state and the selected internal state match each other (step S2704). Upon determining that the detected internal state and the selected internal state match each other (YES in step S2704), the simulation apparatus 100 obtains, from the performance-value table 2500, the association information 2300 in which the selected internal state is associated (step S2705).

The simulation apparatus 100 links the pointer to the target-block and the pointer to the obtained association information 2300 with the association information 2300 for the block immediately preceding the target block (step S2706). By using the obtained association information 2300, the simulation apparatus 100 performs processing for executing the execution code ec (step S2707), and the process returns to S2601. On the other hand, upon determining that the detected internal state and the selected internal state do not match each other (NO in step S2704), the process of the simulation apparatus 100 returns to step S2701.

As described above, the simulation apparatus 100 according to the second embodiment pre-links the association information 2300 for the second block, which is to be executed immediately after the first block, with the association information 2300 in which the internal state and the performance values are associated with each other for the first block. With this arrangement, it is possible to increase the speed of the processing involved in searching the performance-value table for the association information 2300 in which the detected internal state is associated. Thus, it is possible to increase the speed of the performance estimation.

In the first embodiment and the second embodiment, the amount of power consumption may also be estimated, instead of the performance value, such as the execution time or the number of cycles. For example, when the amount of power consumption is estimated, it is assumed that the amount of power consumption that serves as a reference for each instruction and the amounts of power consumption of individual sections in the target CPU are prepared.

The simulation methods described above in the first embodiment and the second embodiment may be realized by executing a prepared program with a computer, such as a personal computer or a workstation. This simulation program is recorded to a computer-readable recording medium, such as the disk 205 or a flash memory, and a computer reads the program from the recording medium for execution. This simulation program may be distributed over the network NET, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A simulation apparatus comprising:
a memory; and
a host processor coupled to the memory and configured to:
   detect an internal state of a target processor, which is an out-of-order processor and executes a target program, when a target block changes, the target block being for an operation simulation which is included in blocks obtained by dividing code of the target program;
   determine whether or not the target block is compiled;
   generate, when determining that the target block is not compiled, association information in which the detected internal state and one or more performance values of one or more instructions included in the target block in the detected internal state are associated with each other and generate an execution code including a first code and a second code, the first code being obtained by compiling the target block, and the second code being capable of calculating a performance value for a predicted case of an externally dependent instruction included in the one or more instructions;
   acquire, when determining that the target block is compiled, a performance value corresponding to the detected internal state from the association information;
   execute the generated execution code by using the generated performance value or execute an execution code of the target block which is determined that a compile is performed by using the acquired performance value;
   determine, when the target block changes, whether or not the changed target block has become a target block in the past; and
   generate the execution code when determining that the target block has not become a target block in the past.

2. The simulation apparatus according to claim 1, wherein the host processor is further configured to:
   link, when the target block changes from a first block to a second block, the association information for the second block with the association information for the first block;
   when the target block changes from a third block to a fourth block, determine whether or not the changed target block has changed from the third block to the fourth block in the past;
   when the changed target block has changed from the third block to the fourth block in the past, determine whether or not the internal state in the association information for the fourth block which is linked with the association information for the third block when the fourth block became the target block from the third block in the past matches the internal state detected for the fourth block; and
   when the internal state in the association information for the fourth block which is linked with the association information for the third block matches the internal state detected for the fourth block, execute the execution code for the fourth block by using the association information for the fourth block linked with the association information generated for the third block.

3. The simulation apparatus according to claim 1, wherein the execution code includes a code for acquiring the acquired performance value from the association information and a code for calculating the performance value when the target processor executes the target block by using the acquired performance value.

4. The simulation apparatus according to claim 1, wherein, in the association information, the detected internal state and the performance value of each of the one or more instructions included in the target block are associated with each other when a status-dependent instruction that is capable of being branched into processes depending on an execution state becomes a first process of the processes; and
wherein the host processor is further configured to:
   when the status-dependent instruction becomes a second process, which is different from the first process, among the processes in the operation simulation, use a performance value of the status-dependent instruction corresponding to the second process, the performance value corresponding to the second process being predetermined.

5. A non-transitory computer-readable recording medium to which a simulation program that causes a computer to execute a simulation process is recorded, the process comprising:
   detecting an internal state of a target processor, which is an out-of-order processor and executes a target program, when a target block changes, the target block being for an operation simulation which is included in blocks obtained by dividing code of the target program;
   determining whether or not the target block is compiled;
   generating, when determining that the target block is not compiled, association information in which the detected internal state and one or more performance values of one or more instructions included in the target block in the detected internal state are associated with each other and generate an execution code including a first code and a second code, the first code being is obtained by compiling the target block, and the second code being capable of calculating a performance value for a predicted case of an externally dependent instruction included in the one or more instructions;
   acquiring, when determining that the target block is compiled, a performance value corresponding to the detected internal state from the association information; and
   executing the execution code by using the generated performance value or execute an execution code of the target block which is determined that a compile is performed by using the acquired performance value;
   determining, when the target block changes, whether or not the changed target block has become a target block in the past; and
   generating the execution code when determining that the target block has not become a target block in the past.

6. The non-transitory computer-readable recording medium according to claim 5, further comprising:
   linking, when the target block changes from a first block to a second block, the association information for the second block with the association information for the first block;
   when the target block changes from a third block to a fourth block, determining whether or not the changed target block has changed from the third block to the fourth block in the past;
   when the changed target block has changed from the third block to the fourth block in the past, determining whether or not the internal state in the association information for the fourth block linked with the association information for the third block when the fourth block became the target block from the third block in the past matches the internal state detected for the fourth block; and
   when the internal state in the association information for the fourth block linked with the association information for the third block matches the internal state detected for the fourth block, executing the execution code for the fourth block by using the association information for the fourth block linked with the association information generated for the third block.

7. The non-transitory computer-readable recording medium according to claim 5, wherein the execution code includes a code for acquiring the acquired performance value from the association information and a code for calculating the performance value when the target processor executes the target block by using the acquired performance value.

8. The non-transitory computer-readable recording medium according to claim 5, wherein, in the association information, the detected internal state and the performance value of each of the one or more instructions included in the target block are associated with each other when a status-dependent instruction that is capable of being branched into processes depending on an execution state becomes a first process of the processes; and
   wherein the host processor is further configured to:
      when the status-dependent instruction becomes a second process, which is different from the first process, among the processes which is different from the first instruction in the operation simulation, use a performance value of the status-dependent instruction corresponding to the second process, the performance value corresponding to the second process being predetermined.

* * * * *